United States Patent
Nagao et al.

(10) Patent No.: US 10,402,305 B2
(45) Date of Patent: Sep. 3, 2019

(54) COMPUTER AND COMPILING METHOD

(71) Applicant: Renesas Electronics Corporation, Kawasaki-shi (JP)

(72) Inventors: Tsuyoshi Nagao, Kawasaki (JP); Shuji Satoh, Kawasaki (JP); Hitoshi Suzuki, Kawasaki (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 38 days.

(21) Appl. No.: 14/469,837

(22) Filed: Aug. 27, 2014

(65) Prior Publication Data
US 2015/0095715 A1 Apr. 2, 2015

(30) Foreign Application Priority Data
Sep. 30, 2013 (JP) .................. 2013-203680

(51) Int. Cl.
*G06F 11/00* (2006.01)
*G06F 11/36* (2006.01)
*G06F 9/30* (2018.01)

(52) U.S. Cl.
CPC ...... *G06F 11/3636* (2013.01); *G06F 9/30032* (2013.01); *G06F 9/30076* (2013.01); *G06F 11/3656* (2013.01)

(58) Field of Classification Search
CPC .................................................. G06F 11/3636
See application file for complete search history.

(56) References Cited

U.S. PATENT DOCUMENTS

| | | | |
|---|---|---|---|
| 5,901,283 A | 5/1999 | Kanzaki | |
| 6,041,406 A | 3/2000 | Mann | |
| 6,314,530 B1* | 11/2001 | Mann | G06F 11/348 714/25 |
| 2004/0250164 A1 | 12/2004 | Ahmad et al. | |
| 2011/0314342 A1* | 12/2011 | Gilkerson | G06F 11/3476 714/45 |
| 2012/0144160 A1 | 6/2012 | Sharawi et al. | |
| 2012/0304154 A1* | 11/2012 | Cabillic | G06F 8/20 717/124 |

FOREIGN PATENT DOCUMENTS

| | | |
|---|---|---|
| EP | 0 130 467 A2 | 1/1985 |
| JP | 10-78889 A | 3/1998 |

OTHER PUBLICATIONS

Extended European Search Report dated Aug. 19, 2015.
European Search Report dated Jun. 30, 2016.
Chinese Office Action dated Aug. 22, 2018, in Chinese Patent Application No. 201410521199.2 with an English translation.

* cited by examiner

*Primary Examiner* — Matthew M Kim
*Assistant Examiner* — Katherine Lin
(74) *Attorney, Agent, or Firm* — McGinn IP Law Group, PLLC

(57) ABSTRACT

To provide new instruction and device suitable for tracing execution of a computer program. In an embodiment, a CPU is configured so as to supply a constant to a trace unit in response to decoding of a first instruction having an immediate field indicating the constant. In addition, the trace unit is configured so as to output trace data including the constant in response to execution of the first instruction in the CPU.

10 Claims, 15 Drawing Sheets

COMPUTER AND COMPILING METHOD

CROSS-REFERENCE TO RELATED APPLICATION

The disclosure of Japanese Patent Application No. 2013-203680 filed on Sep. 30, 2013 including the specification, drawings and abstract is incorporated herein by reference in its entirety.

BACKGROUND

The present invention relates to a computer and is suitably used for, for example, a computer that outputs trace data based on execution of a program.

A multiprogramming environment means an environment in which a plurality of programs is, so to speak, executed in parallel by periodically switching the programs or switching a program to be executed in response to an occurrence of an event. The multiprogramming may also be referred to as multiprocess, multithread, multitask, and the like. A process, a thread, and a task mean a processing unit that is executed in parallel in the multiprogramming environment. Although these terms are often mixed up and used, generally, the process is a parallel processing unit to which a program execution environment such as a memory space is independently assigned and which is highly independent from other processes. On the other hand, the thread is a smaller parallel processing unit included in a process that is processed in parallel. In a multithread environment, a process includes a plurality of threads. Each thread can access a resource assigned to the process, and a plurality of threads in the same process shares a memory space. The thread and the process may be referred to as a task.

In order to support debug of a program executed in the multiprogramming environment, there is known a tool which displays a chart showing executions of functions, threads, or processes and transitions of these, as shown in FIG. 1. In the example of FIG. 1, time transition of tasks (that is, threads or processes) is visually displayed. Meanwhile, the function is a packaged program module including an instruction sequence for performing specific processing. The term of "function" used in the present specification means a concept including a function in a strict sense that returns a return value and a procedure that does not return a return value, according to C and C++ that are typical of structured programming languages. The term of "function" used in the present specification can be referred to as a subroutine, a subprogram, or a method.

In order to grasp the transition of function, thread, or process, in compiling which generates assembly code from source code, a code called a marker instruction or a check point instruction is inserted in the assembly code. The marker instruction or the check point instruction is different from arithmetic instructions and load/store instructions for performing original processing described in the source code and is a debug instruction defined to trace an execution of a program. The marker instruction or the checkpoint instruction is executed on a computer configured to output trace data based on execution of a program.

For example, Japanese Patent Laid-Open No. 1998-78889 (Patent Literature 1) discloses a computer including a CPU (Central Processing Unit) and a monitor unit. In Patent Literature 1, the CPU (Central Processing Unit) supplies a marker decoding signal (a pulse signal) to the monitor unit in order to activate the monitor unit in response to decoding of the marker instruction. In addition, in response to reception of the marker decoding signal, the monitor unit acquires an address of the marker instruction (a program counter value) and a value of an accumulator, and outputs trace data including an identifier indicating the marker instruction (for example, an identifier such as "M"), the address of the marker instruction, and the value of the accumulator.

SUMMARY

As shown in Patent Literature 1, the marker instruction (or the check point instruction) is generally used in order to output trace data including an identifier indicating the marker instruction (for example, an identifier such as "M"), an address of the marker instruction, and a value of a register such as an accumulator. However, such a marker instruction (or check point instruction) and an operation of a computer according to the marker instruction may be insufficient to trace an execution of a complicated computer program.

For example, a case is considered where a computer executes a program in which the marker instruction is arranged immediately before a function. In this case, it is considered that a debugger (a debug host) identifies the function ID corresponding to the address of the marker instruction by preparing a table that defines a correspondence relationship between the marker instruction and a function ID (identifier) and by comparing the address of the marker instruction included in the trace data with the table. However, the function ID corresponding to the address of the marker instruction is not necessarily determined uniquely. For example, in an overlay program or the like, different programs may use the same instruction address. Therefore, it is not possible to uniquely distinguish the function ID only by the instruction address. When the trace data includes execution results of a plurality of marker instructions having the same instruction address, it is difficult to identify the function executed by the computer on the basis of the instruction address of the marker instruction. Therefore, there is a first problem of having difficulty in grasping the transition of function, thread, or process on the basis of the trace data, when a computer is running.

In addition, for example, values of a plurality of registers, for example, a plurality of arguments or a plurality of return values of a function or a thread, are required to be output as trace data. In this case, generally, a plurality of instructions, the number of which corresponds to the number of the registers has to be arranged in a program. Therefore, there is a second problem in which many instructions (generally, the number of instructions is the same as the number of registers whose values are outputted) are required in order to output values of a plurality of registers as trace data.

Hereinafter, a plurality of embodiments that can contribute to solving at least one of a plurality of problems including the first and the second problems described above will be described. The other problems and the new feature of the present invention will become clear from the description of the present specification and the accompanying drawings.

Means for Solving the Problems

In an embodiment, a CPU supplies a constant to a trace unit in response to decoding of a first instruction having an immediate field indicating the constant. In addition, the trace unit outputs trace data including the constant in response to execution of the first instruction in the CPU.

In another embodiment, a CPU supplies values of a plurality of registers to the trace unit in response to decoding of one instruction having a field indicating the plurality of registers. In addition, the trace unit outputs trace data including the values of the registers in response to execution of the one instruction in the CPU.

The plurality of embodiments described above can contribute to solving at least one of the first and the second problems described above.

DETAILED DESCRIPTION

Hereinafter, specific embodiments will be described in detail with reference to the drawings. In each drawing, the same reference symbol is given to the same or corresponding component and redundant description is omitted if necessary for clarity of description.

(First Embodiment)

Figure 1:
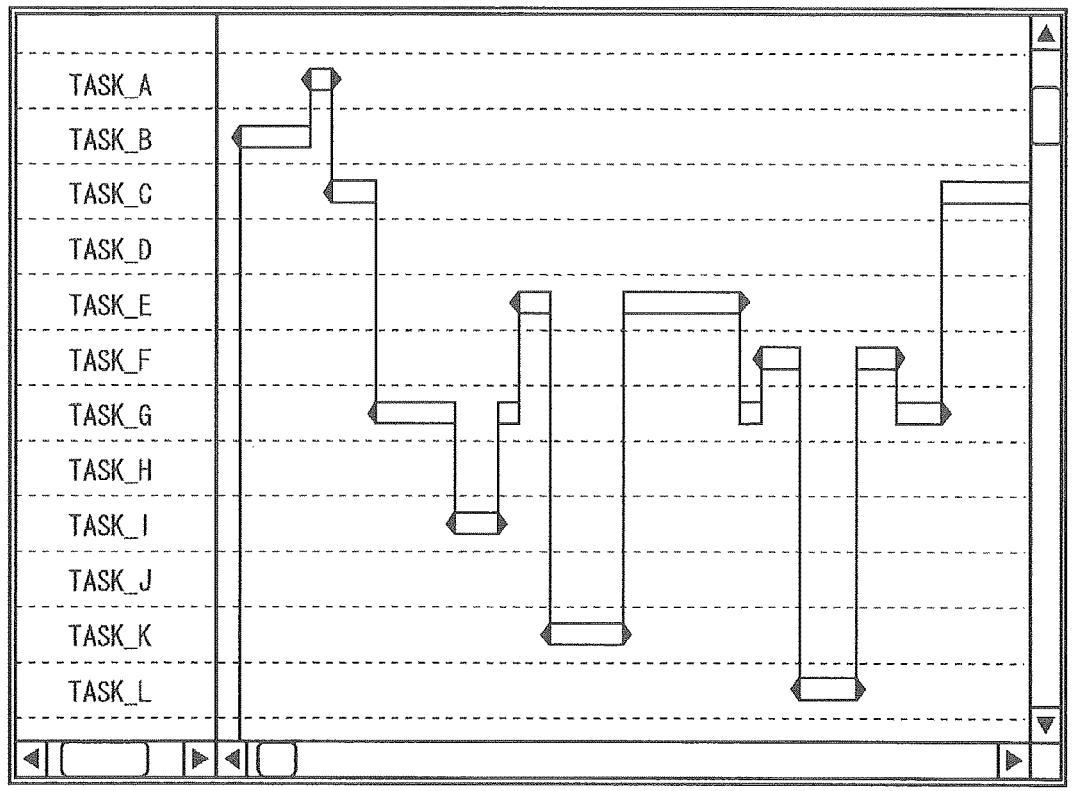
FIG. 1 is an example of a chart showing transition of tasks according to a background art.
Figure 2:
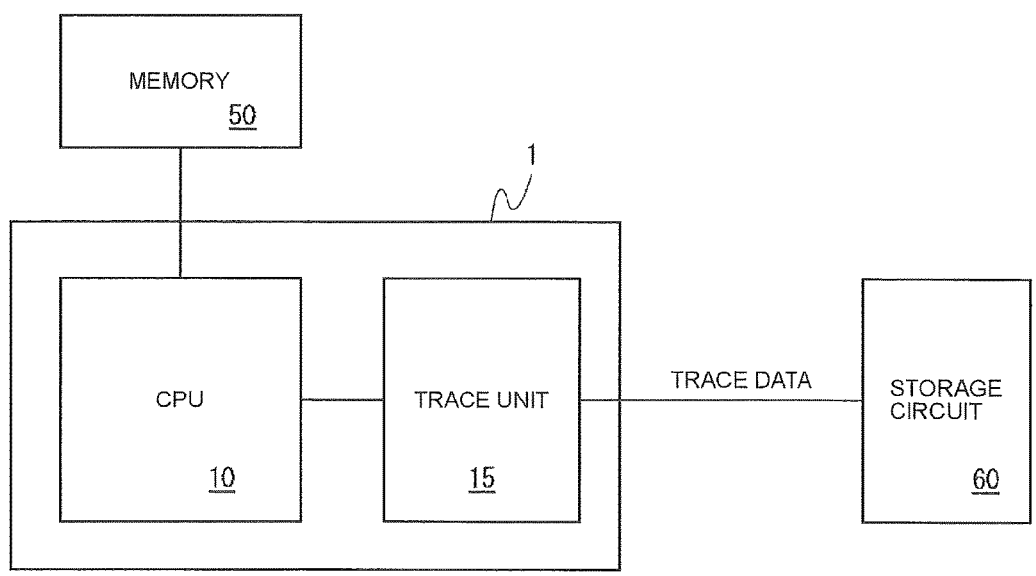
FIG. 2 is a block diagram showing a computer according to a first embodiment and peripheral devices of the computer.

FIG. 2 is a block diagram showing a computer 1 according to the present embodiment and peripheral devices of the computer 1. The computer 1 according to the present embodiment is, for example, a microprocessor, a microcomputer, a microcontroller, or a SoC (System on Chip). The computer 1 may be configured by only one IC chip or may be configured by a plurality of IC chips. The computer 1 provides a multiprogramming environment. The computer 1 is configured so as to execute a computer program (an executable program) and to output trace data based on the execution of the computer program, and is coupled to a memory 50 and a storage device 60.

The memory 50 stores a computer program (an instruction group) to be executed in the computer 1, data to be calculated in the computer 1, data that have been calculated in the computer 1, and the like. In other words, the memory 50 includes an instruction memory (or an instruction cache) and a data memory (or a data cache). The memory 50 may be configured by a volatile memory, a non-volatile memory, or a combination of these. The volatile memory is, for example, an SRAM (Static Random Access Memory), a DRAM (Dynamic Random Access Memory), or a combination of these. The non-volatile memory is, for example, a mask ROM (Read Only Memory), a programmable ROM, a flash memory, a hard disk drive, or a combination of these.

The storage device 60 stores trace data outputted from the computer 1. The storage device 60 may be configured by a volatile memory, a non-volatile memory, or a combination of these. The storage device 60 may be arranged in the same chip as the computer 1 (on-chip) or may be arranged outside the computer 1 (off-chip). The storage device 60 may be arranged in a computer system (that is, a debug host) that executes debugger software and controls debugging of a target system including the computer 1 and the memory 50.

The computer 1 includes a CPU (Central Processing Unit) 10 and a trace unit 15. The CPU 10 can be referred to as an MPU (Micro Processing Unit), a CPU core, an MPU core, or a processor core. The CPU 10 reads an instruction included in the computer program from the memory 50, decodes the instruction, and executes processing such as calculation, memory access (load and store), and the like according to the instruction. Furthermore, the CPU 10 operates so as to generate trace information in response to decoding of an instruction defined for debug or trace, included in the computer program and to supply the trace information to the trace unit 15. The CPU 10 may include a cache memory, an instruction fetch unit, an instruction decode unit, a control unit such as a sequencer, an ALU (Arithmetic Logic Unit), a load/store unit, and other functional units. The ALU includes arithmetic operation units such as an adder, a multiplier, and a divider; a logical operation unit; a shifter, and the like.

The trace unit 15 receives the trace information from the CPU 10, generates trace data by formatting the trace information, and outputs the trace data to the storage device 60. The trace unit 15 may include a trace controller that controls trace, a trace buffer that temporarily stores the trace information, and an interface for communicating with the storage device 60.

Furthermore, in the computer 1 according to the present embodiment, in response to decoding of a DBTAG instruction having an immediate field that indicates a constant, the CPU 10 operates so as to supply the constant indicated in the immediate field of the DBTAG instruction to the trace unit 15. In addition, the trace unit 15 operates so as to output trace data including the constant indicated in the immediate field of the DBTAG instruction in response to execution of the DBTAG instruction in the CPU 10.

The DBTAG instruction is an instruction defined in order to trace execution of the computer program executed in the CPU 10. For example, the DBTAG instruction can be used in order to trace execution of a function, a thread, a process, or a task included in the computer program. In this case, the immediate field of the DBTAG instruction may indicate an identifier of the function, the thread, the process, or the task included in the computer program. The DBTAG instruction may be arranged close to a module (that is, an instruction group) corresponding to the function, the thread, the process, or the task in the computer program. For example, the DBTAG instruction may be arranged immediately before the instruction group of the function, the thread, the process or the task, in the instruction group, or immediately after the instruction group. The identifier of the function, the thread, the process, or the task may be automatically inserted in assembly code by a compiler during compiling processing in which the assembly code is generated from source code.

In addition, the DBTAG instruction may be used for other uses. For example, the DBTAG instruction may be used for a user (programmer) to output any bit string or character string as trace data. In this case, the user (programmer) may arrange a debug instruction having an immediate field indicating any bit string, in source code of a high-level language described in C language, C++ language, or the like. Furthermore, the compiler may convert the debug instruction into one DBTAG instruction.

Figure 3:
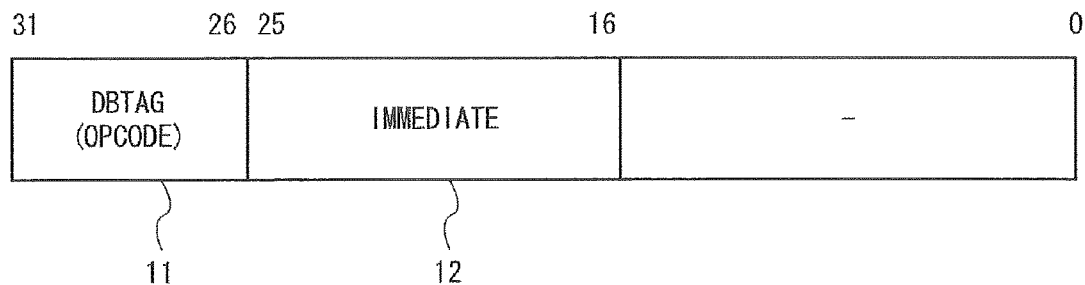
FIG. 3 is a diagram showing an example of an instruction format of a DBTAG instruction according to the first embodiment.

FIG. 3 shows an example of an instruction format of the DBTAG instruction. In the example shown in FIG. 3, the DBTAG instruction has 32-bit length overall including an operation code field 11 of 6-bit length and an immediate field 12 of 10-bit length. The operation code field 11 indicates that the instruction is the DBTAG instruction. As described above, the immediate field 12 is used in order to indicate an identifier of, for example, a function, a thread, a process, or a task. Meanwhile, FIG. 3 is an example, and the bit length of the DBTAG instruction may not be 32 bits, the bit length of operation code field 11 may not be 6-bits, and the bit length of the immediate field 12 may not be 10 bits.

Figure 4:
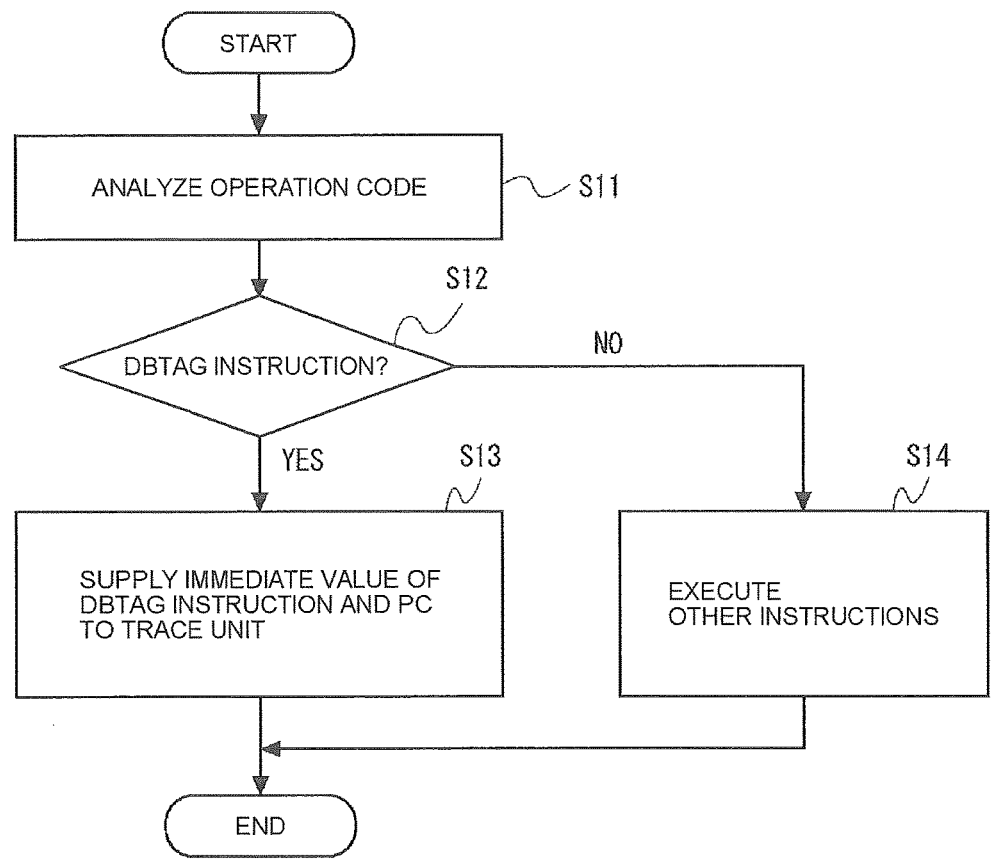
FIG. 4 is a flowchart showing an example of an operation of a CPU according to the first embodiment.

FIG. 4 is a flowchart showing an example of an operation of the CPU 10 that executes a computer program (an executable program) including the DBTAG instruction. In step S11, the CPU 10 analyzes an operation code of an instruction fetched from the memory 50. When the instruction decoded in step S11 is the DBTAG instruction (YES in step S12), the CPU 10 supplies a value of the immediate field of the DBTAG instruction and a value of a program counter (PC), to the trace unit 15 (step S13). The program counter (PC) is an instruction address register used in order to indicate an address in the memory at which an instruction to be executed next by the CPU 10 is stored. The PC value supplied to the trace unit 15 in step S13 indicates an address of the DBTAG instruction decoded in step S11. On the other hand, when the instruction decoded in step S11 is not the DBTAG instruction (NO in step S12), the CPU 10 performs processing in accordance with the decoded instruction (step S14).

As understood from the above description, in the computer according to the present embodiment, in response to decoding of the DBTAG instruction having the immediate field that indicates a constant, the CPU 10 operates so as to supply the constant indicated in the immediate field of the DBTAG instruction, to the trace unit 15. In addition, the trace unit 15 operates so as to output trace data including the constant indicated in the immediate field of the DBTAG instruction in response to execution of the DBTAG instruction in the CPU 10.

For example, the immediate field of the DBTAG instruction may be used in order to indicate an identifier of a function, a thread, a process, or a task, included in a computer program. Thereby, a debugger (a debug host) can directly acquire the identifier of the function, the thread, the process, or the task by referring to the constant value indicated in the immediate field of the DBTAG instruction included in the trace data. In other words, the debugger (the debug host) need not prepare a table that defines a correspondence relationship between an address of the DBTAG instruction and a function ID (a thread ID, a process ID, or a task ID) and need not estimate the function ID (the thread ID, the process ID, or the task ID) based on the address of the DBTAG instruction. Therefore, even when debugging an overlay program in which different programs may use the same instruction address, it is possible to uniquely identify the function ID (the thread ID, the process ID, or the task ID) on the basis of a value in the immediate field of the DBTAG instruction.

Furthermore, the CPU 10 according to the present embodiment may be configured so that when decoding the DBTAG instruction, the CPU 10 supplies an immediate value of the DBTAG instruction to the trace unit 15 without storing the immediate value of the DBTAG instruction in a general-purpose register (GPR). It is considered that the marker instruction and the check point instruction described in Related Art are used for applications outputting the value of the GPR that stores, in advance, any value such as the function ID. However, in order to do so, the CPU has to execute an instruction (for example, a MOV instruction) to store any value such as the function ID in the GPR, before executing the marker instruction and the check point instruction. Moreover, in a method of temporarily storing any value such as the function ID in the GPR, the GPR that may be used by a user program for another purpose is used for a trace that is irrelevant to the original program flow. Therefore, the value in the GPR used by the user program may be overwritten. In order to avoid the breakdown of the register, it is necessary to temporarily save the value of the GPR in a memory or the like before storing any value such as the function ID in the GPR. In addition, it is necessary to store again the value saved in the memory or the like in the original GPR after executing the marker instruction and the check point instruction. Naturally, the program size and the processing time of the CPU increase due to the increase of the above processes. Therefore, by supplying the immediate value of the DBTAG instruction to the trace unit 15 without storing the immediate value of the DBTAG instruction in the GPR, it is possible to efficiently include any value such as the function ID in the trace data, without executing redundant instructions and processes.

Furthermore, the DBTAG instruction may be defined as one instruction. In other words, the DBTAG instruction may be described as one assembly instruction in assembly code. Thereby, it is possible to reduce the number of instructions added to a program for debug or trace, and to thereby reduce the program code size.

Figure 5:
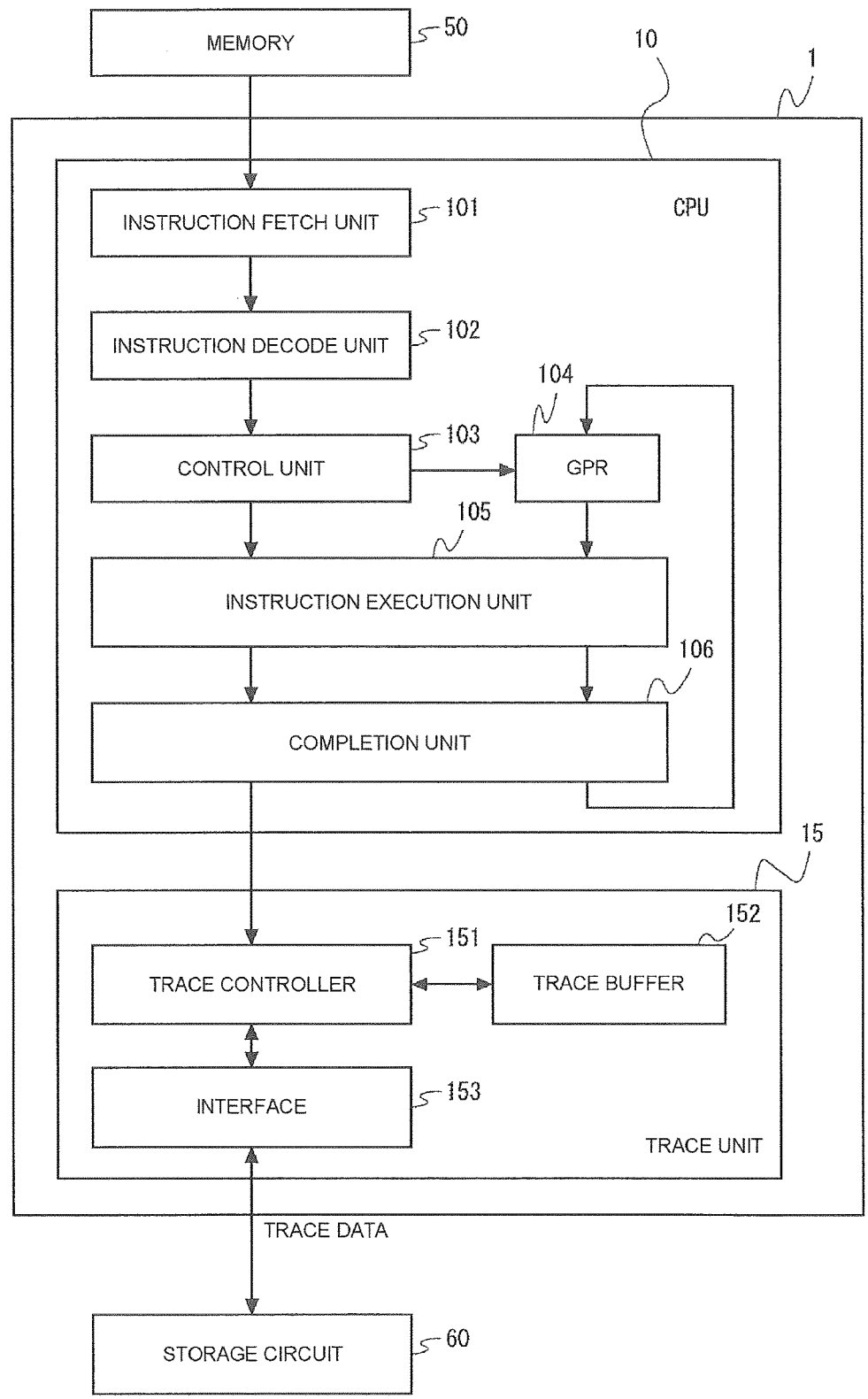
FIG. 5 is a block diagram showing a configuration example of the computer according to the first embodiment.

Hereinafter, a specific example of configuration and operation of the computer 1 according to the present embodiment will be described in further detail. FIG. 5 shows a configuration example of the CPU 10 and the trace unit 15 included in the computer 1. In the configuration example of FIG. 5, the CPU 10 includes an instruction fetch unit 101, an instruction decode unit 102, a control unit 103, a general-purpose register (GPR) file 104, an instruction execution unit 105, and a completion unit 106. The instruction fetch unit 101 fetches an instruction from the memory 50. The instruction decode unit 102 decodes the fetched instruction.

The control unit 103 controls operations of the functional units (for example, the instruction decode unit 102, the general-purpose register file 104, and the instruction execution unit 105) in the CPU 10 on the basis of a decode result of the instruction. Namely, the control unit 103 outputs a signal according to the decoded instruction to the functional units (for example, the instruction decode unit 102, the general-purpose register file 104, and the instruction execution unit 105) in the CPU 10. For example, the control unit 103 outputs a control signal indicating a type of calculation to the instruction execution unit 105. Furthermore, when the instruction is an immediate instruction, the control unit 103 supplies the immediate value to the instruction execution unit 105. The control unit 103 may include a sequencer (a multi-cycle sequencer) for controlling issuance of a multi-cycle instruction. The control unit 103 may be referred to as a command generation unit and may also be referred to as a dispatch unit.

The general-purpose register file 104 includes a plurality of general-purpose registers (GPRs). The general-purpose register file 104 is versatilely used in order to temporarily store data inputted into the instruction execution unit 105 and data outputted from the instruction execution unit 105. Therefore, the GPRs included in the general-purpose register file 104 are generally specified as a register operand in an instruction executed by the CPU 10.

The instruction execution unit 105 performs specific data processing according to an instruction, such as arithmetic operation, logical operation, and load/store. The instruction execution unit 105 includes an ALU (Arithmetic Logic Unit) and a load/store unit. The ALU includes arithmetic operation units such as an adder, a multiplier and a divider, a logical operation unit, and a shifter. When executing a general arithmetic operation instruction, a general logical operation instruction, and a general register transfer instruction which have a register operand, the instruction execution unit 105 receives a value in a register from the general-purpose register file 104 and performs operation. The instruction execution unit 105 writes back an operation result to the general-purpose register file 104 via the completion unit 106.

The completion unit 106 controls completion (retirement) of an instruction. For example, the completion unit 106 discards an entry of instruction after an interrupt or an instruction related to exception, from pipeline. Furthermore, the completion unit 106 of the present embodiment has an interface with the trace unit 15 and supplies trace information generated by execution of a trace instruction such as the DBTAG instruction, to the trace unit 15.

Next, a configuration example of the trace unit 15 shown in FIG. 5 will be described. The trace unit 15 shown in FIG. 5 includes a trace controller 151, a trace buffer 152, and an interface 153. The trace controller 151 includes an interface with the CPU 10 and an interface with the trace buffer 152. The trace controller 151 receives the trace information from the CPU 10, arranges the trace information into a format of trace data, and accumulates the trace data in the trace buffer 152. The trace buffer 152 is a storage area for temporarily accumulating the trace data. The trace controller 151 acquires the trace data accumulated in the trace buffer 152 and writes the trace data to the storage device 60 via the interface 153.

Figure 6:
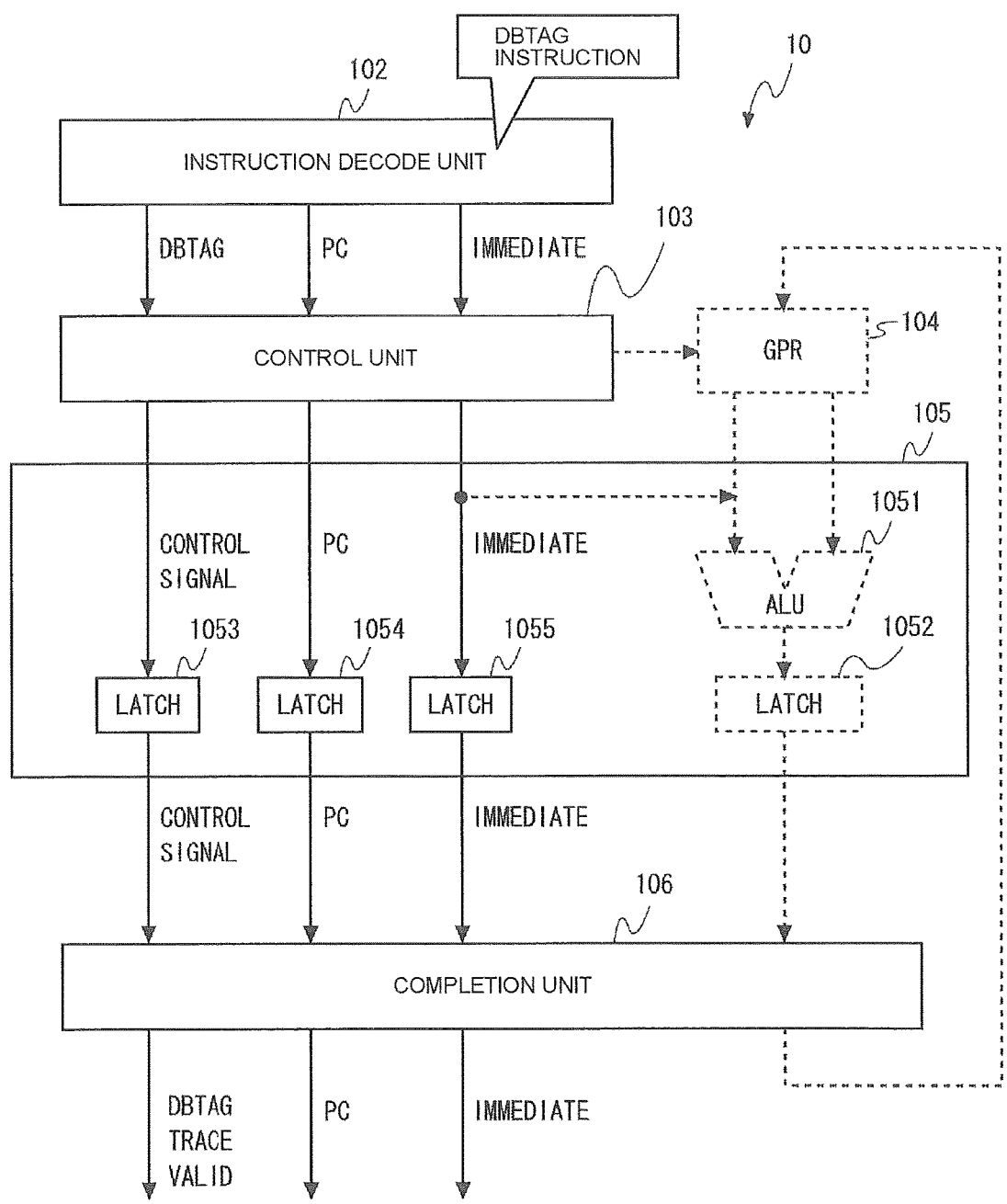
FIG. 6 is a block diagram showing an example of a configuration of the CPU according to the first embodiment.

Subsequently, hereinafter, there will be described a specific example of an operation of the CPU 10 when the CPU 10 decodes the DBTAG instruction, with reference to FIG. 6. In the example of FIG. 6, the CPU 10 is configured so that the CPU 10 does not store a constant indicated in the immediate field of the DBTAG instruction in the execution of the DBTAG instruction but supplies the constant to the trace unit 15. Specifically, the instruction decode unit 102 notifies the control unit 103 of a notification DBTAG indicating the DBTAG instruction, an instruction address (PC value) PC of the DBTAG instruction, and the immediate value (the value in the immediate field) IMMEDIATE of the DBTAG instruction, in response to decoding of the DBTAG instruction. The control unit 103 generates a control signal indicating the DBTAG instruction and supplies the control signal, the instruction address (PC value) of the DBTAG instruction, and the immediate value of the DBTAG instruction, to the instruction execution unit 105.

The instruction execution unit 105 shown in FIG. 6 includes an ALU 1051 that performs arithmetic operation, logical operation and the like, a latch 1052 that holds output data of the ALU 1051, and latches 1053 to 1055. The latches 1053 to 1055 are arranged in order to hold the control signal indicating the DBTAG instruction, the instruction address (PC value) of the DBTAG instruction, and the immediate value of the DBTAG instruction. The instruction execution unit 105 holds, at the latches 1053 to 1055, the control signal indicating the DBTAG instruction, the instruction address (PC value) of the DBTAG instruction, and the immediate value of the DBTAG instruction in an execution cycle of the DBTAG instruction, and outputs these data to the completion unit 106 in the next cycle. Namely, the instruction execution unit 105 does not supply the immediate value of the DBTAG instruction to the ALU 1051 and does not write the immediate value of the DBTAG instruction to the general-purpose register file 104. The general-purpose register file 104, the ALU 1051, and the latch 1052, which are shown by dashed lines in FIG. 6, indicate that these components are not used for execution of the DBTAG instruction.

The completion unit 106 receives, from the instruction execution unit 105, the control signal indicating the DBTAG instruction, the instruction address (PC value) of the DBTAG instruction, and the immediate value of the DBTAG instruction. The completion unit 106 detects that the reception of the instruction address (PC value) and the immediate value from the instruction execution unit 105 is valid in response to reception of the control signal indicating the DBTAG instruction. In addition, the completion unit 106 outputs, to the trace unit 15, a DBTAG trace valid signal, the instruction address (PC value) of the DBTAG instruction, and the immediate value of the DBTAG instruction. Here, the DBTAG trace valid signal notifies the trace unit 15 of the fact that trace information including the instruction address and the immediate value of the DBTAG instruction is valid.

According to the configuration and the operation of the CPU 10 shown in FIG. 6, it is possible to efficiently supply the value in the immediate field of the DBTAG instruction to the trace unit 15. As an example, when the immediate field of the DBTAG instruction indicates a function ID (a thread ID, a process ID, or a task ID), the CPU 10 in FIG. 6 can efficiently supply the function ID (the thread ID, the process ID, or the task ID) to the trace unit 15. This is because the CPU 10 shown in FIG. 6 does not require redundant operation such as writing the value of the immediate field of the DBTAG instruction to the general-purpose register file 104. Furthermore, this is because the CPU 10 shown in FIG. 6 does not require (a) processing of temporarily saving the value of GPR in the general-purpose register file 104 into a memory or the like before executing the marker instruction and the check point instruction, (b) processing of storing any value such as the function ID into the GPR when executing the marker instruction and the check point instruction, and (c) processing of storing the value saved in the memory or the like into the original GPR after executing the marker instruction and the check point instruction.

As understood from the above description, in the computer 1 according to the present embodiment, in response to decoding of the DBTAG instruction having the immediate field that indicates a constant, the CPU 10 operates so as to supply the constant indicated in the immediate field of the DBTAG instruction to the trace unit 15. In addition, the trace unit 15 operates so as to output trace data including the constant indicated in the immediate field of the DBTAG instruction in response to execution of the DBTAG instruction in the CPU 10. For example, the immediate field of the DBTAG instruction may be used in order to indicate an identifier of a function, a thread, a process, or a task, included in a computer program. Thereby, a debugger (a debug host) can directly acquire the identifier of the function, the thread, the process, or the task by referring to the constant value indicated in the immediate field of the DBTAG instruction included in the trace data. Therefore, even when debugging an overlay program in which different programs may use the same instruction address, it is possible to uniquely identify the function ID (the thread ID, the process ID, or the task ID) on the basis of the value in the immediate field of the DBTAG instruction, by using the computer 1 according to the present embodiment.

(Second Embodiment)

Figure 7:
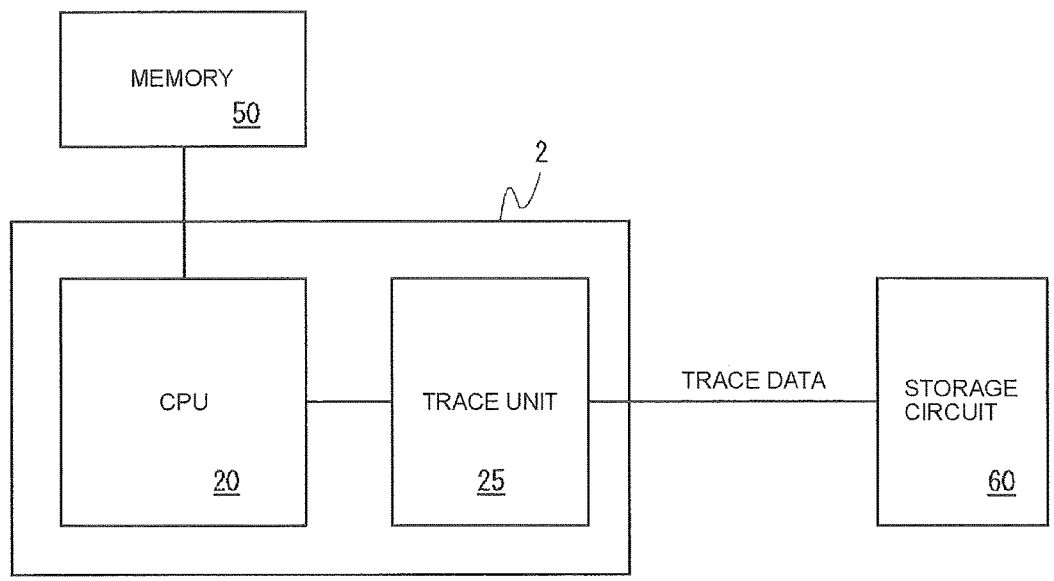
FIG. 7 is a block diagram showing a computer according to a second embodiment and peripheral devices of the computer.

FIG. 7 is a block diagram showing a computer 2 according to the present embodiment and peripheral devices of the computer 2. The computer 2 according to the present embodiment includes a CPU 20 and a trace unit 25 coupled to the CPU 20. The entire configuration of the computer 2 is the same as the configuration example of the computer 1 of the first embodiment shown in FIG. 2 or FIG. 5.

In the computer 2, in response to decoding of one DBPUSH instruction having a field indicating a plurality of registers, the CPU 20 operates so as to supply values of the registers specified by the DBPUSH instruction to the trace unit 25. The trace unit 25 operates so as to output trace data including the values of the registers specified by the DBPUSH instruction in response to execution of the one DBPUSH instruction in the CPU 20.

The DBPUSH instruction is an instruction defined in order to trace execution of a computer program executed in the CPU 20. The DBPUSH instruction can be used in order to output, as the trace data, values of a plurality of general-purpose registers implemented in the CPU 20, and the values of the general-purpose registers are outputted as the trace data by one DBPUSH instruction. Therefore, a plurality of instructions is not required in order to output the values of the general-purpose registers as the trace data, and thus the DBPUSH instruction has an advantage that the program code size can be reduced.

For example, the DBPUSH instruction can be used in order to output a plurality of arguments or a plurality of return values of a function included in the computer program. In this case, the DBPUSH instruction indicates a plurality of general-purpose registers holding the arguments of the function or the general-purpose registers holding the return values of the function. The DBPUSH instruction may be arranged close to a module corresponding to a function (that is, an instruction group). For example, the DBPUSH instruction may be arranged immediately before, at the top position of, at the tail position of, or immediately after an instruction group of a function. The DBPUSH instruction may be automatically inserted in assembly code by a complier in compiling processing.

The DBPUSH instruction may be used in order to trace values of a plurality of any registers by a user (a programmer). In this case, the DBPUSH instruction may be arranged in source code of a high-level language by the user (the programmer). In addition, the DBPUSH instruction may be automatically inserted in assembly code by a complier in the compiling processing.

Figure 8:
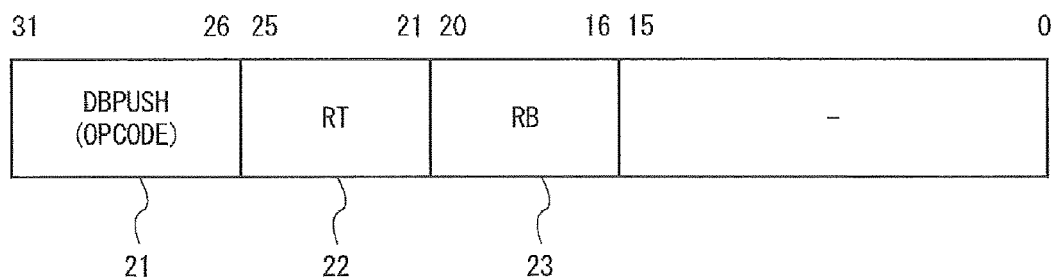
FIG. 8 is a diagram showing an example of an instruction format of a DBPUSH instruction according to the second embodiment.

FIG. 8 shows an example of an instruction format of the DBPUSH instruction. In the example shown in FIG. 8, the DBPUSH instruction has 32-bit length overall including an operation code field 21 of 6-bit length, a first register operand field 22 of 5-bit length, and a second register operand field 23 of 5-bit length. The operation code field 21 indicates that the instruction is the DBPUSH instruction. The first and the second register operand fields 22 and 23 indicate a range of general-purpose registers to be outputted as the trace data. For example, the first register operand field 22 indicates a register number of the top register to be outputted and the second register operand field 23 indicates a register number of the tail register to be outputted. For example, when the first register operand field 22 indicates a register number 2 (a general-purpose register R2) and the second register operand field 23 indicates a register number 5 (a general-purpose register R5), four register values of the general-purpose registers R2, R3, R4, and R5 are outputted.

Figure 9:
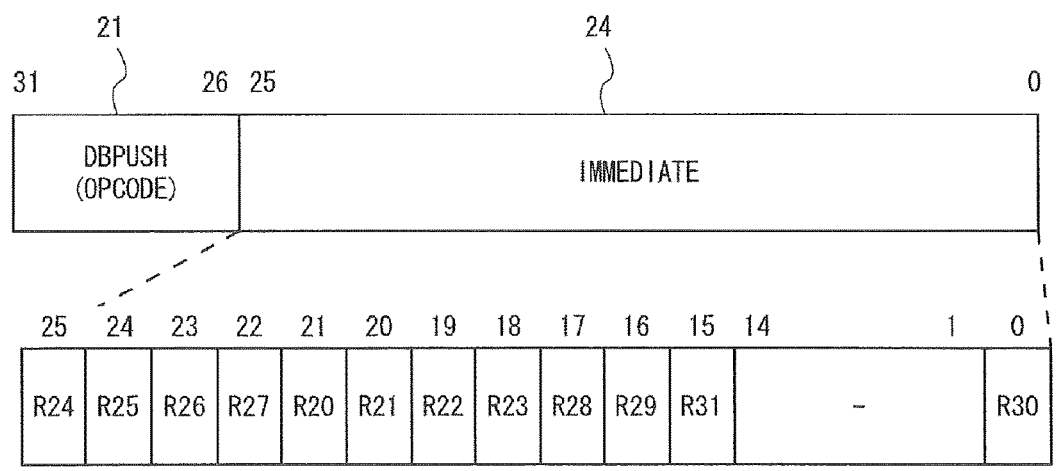
FIG. 9 is a diagram showing another example of an instruction format of the DBPUSH instruction according to the second embodiment.

FIG. 9 shows another example of the instruction format of the DBPUSH instruction. In the example of FIG. 9, a list of registers to be outputted as the trace data is specified instead of the range of the registers. Specifically, the DBPUSH instruction shown in FIG. 9 has 32-bit length overall including an operation code field 21 of 6-bit length and an immediate field 24 of 26-bit length. Each bit of the immediate field 24 of 26-bit length is associated on a one-to-one basis with any of a plurality of general-purpose registers. In the example of FIG. 9, twelve general-purpose registers R20 to R31 are associated with twelve bits of the immediate field 24.

Figure 10:
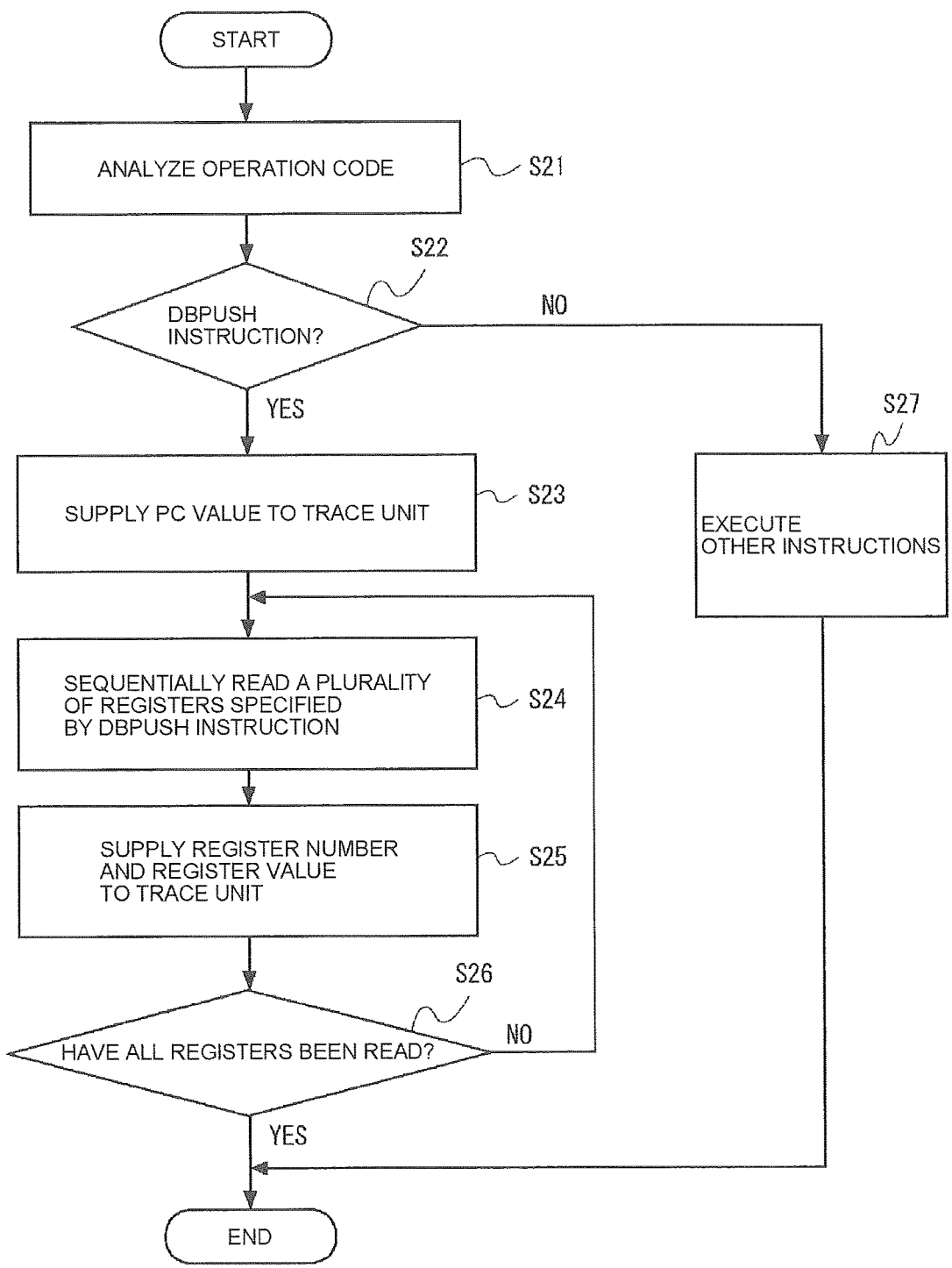
FIG. 10 is a flowchart showing an example of an operation of a CPU according to the second embodiment.

FIG. 10 is a flowchart showing an example of an operation of the CPU 20 that executes a computer program (an executable program) including the DBPUSH instruction. In step S21, the CPU 20 analyzes an operation code of an instruction fetched from the memory 50. When the instruction decoded in step S21 is the DBPUSH instruction (YES in step S22), the CPU 20 supplies a program counter (PC) value of the DBPUSH instruction to the trace unit 25 (step S23). The program counter (PC) is an instruction address register used in order to indicate an address in the memory at which an instruction to be executed next by the CPU 20 is stored. The PC value supplied to the trace unit 25 in step S23 indicates an address of the DBPUSH instruction decoded in step S21. In steps S24 to S26, the CPU 20 sequentially reads the general-purpose registers specified by the DBPUSH instruction and supplies the read register values and the register numbers of the general-purpose registers, to the trace unit 25. The CPU 20 repeats steps S24 to S26 until all the general-purpose registers specified by the DBPUSH instruction have been read. On the other hand, if the instruction decoded in step S21 is not the DBPUSH instruction (NO in step S22), the CPU 20 performs processing according to the decoded instruction (step S27).

Subsequently, hereinafter, a specific example of an operation of the CPU 20 when the CPU 20 decodes the DBPUSH instruction will be described with reference to FIG. 11. The instruction decode unit 202 notifies the control unit 203 of a notification DBPUSH indicating the DBPUSH instruction, an instruction address (PC value) PC of the DBPUSH instruction, and a plurality of register numbers specified by the DBPUSH instruction (or a register range defined by a top register number and a tail register number) REGISTER NOS. in response to decoding of the DBPUSH instruction. The control unit 203 generates a control signal indicating the DBPUSH instruction and supplies the control signal and the instruction address (PC value) of the DBPUSH instruction to the instruction execution unit 205.

Furthermore, the control unit 203 assigns a register number to a general-purpose register file 204 in order to read a register value from the general-purpose register file 204. The general-purpose register file 204 supplies a register value of the register number assigned from the control unit 203 to the instruction execution unit 205. In FIG. 11, a signal line between the control unit 203 and the general-purpose register file 204 is branched and the register number is also supplied to the instruction execution unit 205. Moreover, the control unit 203 has a multi-cycle sequencer 2031. The reading of each of the general-purpose registers specified by the DBPUSH instruction is sequentially performed for each cycle. Therefore, the multi-cycle sequencer 2031 controls the reading of a plurality of register values from the general-purpose register file 204 in multiple cycles and controls issuing of a command to the instruction execution unit 205.

Figure 11:
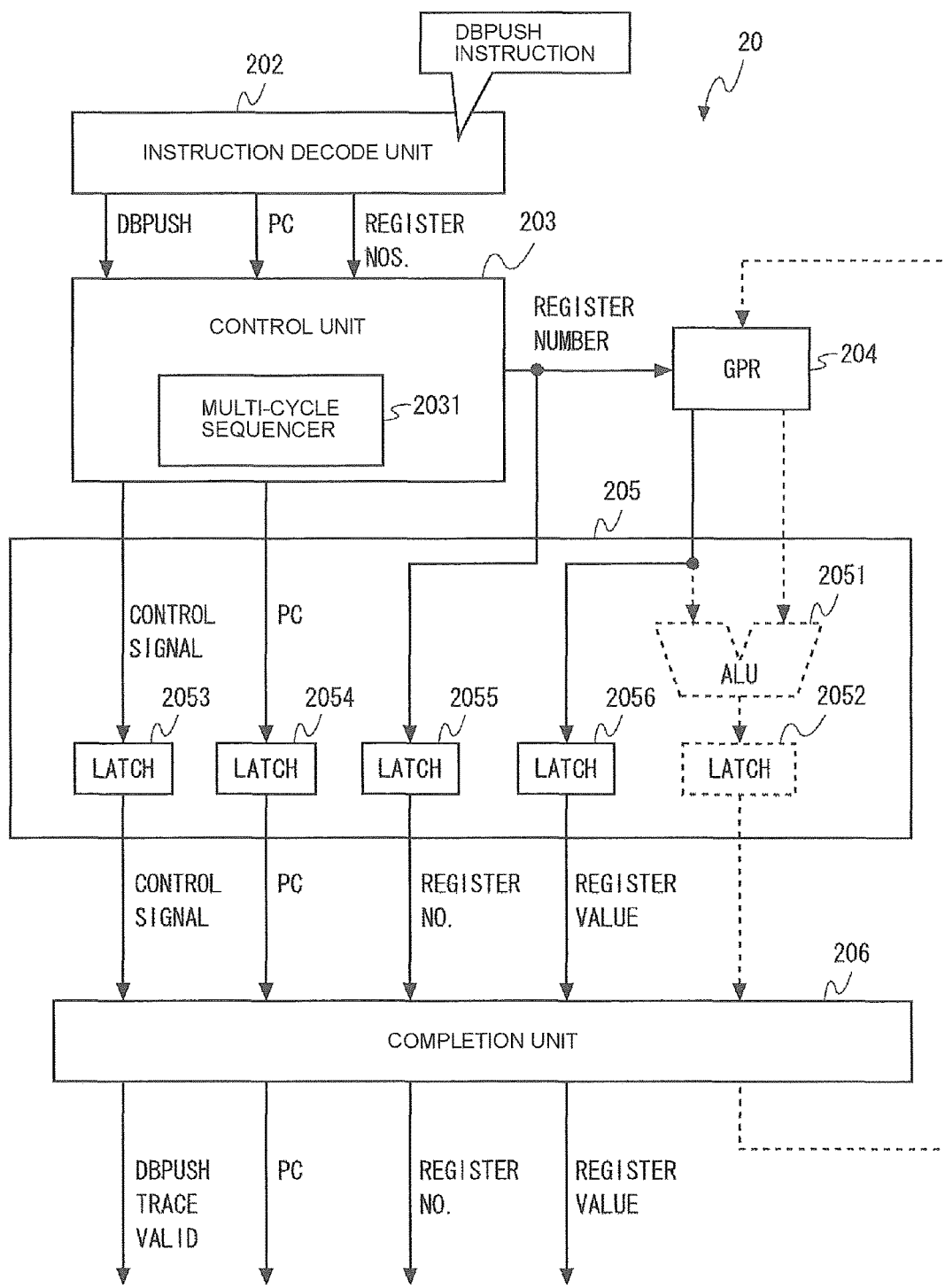
FIG. 11 is a block diagram showing an example of a configuration of the CPU according to the second embodiment.

The instruction execution unit 205 shown in FIG. 11 has an ALU 2051 that performs arithmetic operation, logical operation, and the like, a latch 2052 that holds output data of the ALU 2051, and latches 2053 to 2056. The latches 2053 to 2056 are arranged in order to hold the control signal indicating the DBPUSH instruction, the instruction address (PC value), the register number, and the register value of the DBPUSH instruction. The instruction execution unit 205 holds, at the latches 2053 to 2056, the control signal indicating the DBPUSH instruction, the instruction address (PC value), the register number, and the register value of the DBPUSH instruction, in an execution cycle of the DBPUSH instruction and outputs these data to the completion unit 206 in the next cycle. Namely, the instruction execution unit 205 does not supply, to the ALU 2051, the register value outputted from the general-purpose register file 204 on the basis of the DBPUSH instruction. The ALU 2051 and the latch 2052, which are shown by dashed lines in FIG. 11, indicate that these components are not used in order to execute the DBPUSH instruction.

The completion unit 206 receives, from the instruction execution unit 205, the control signal indicating the DBPUSH instruction, the instruction address (PC value) of the DBPUSH instruction, the general-purpose register number, and the register value outputted from the general-purpose register file 204 on the basis of the DBPUSH instruction. The completion unit 206 detects that the reception of the instruction address (PC value), the register number, and the register value, from the instruction execution unit 205 is valid in response to reception of the control signal indicating the DBPUSH instruction. In addition, the completion unit 206 outputs, to the trace unit 25, a DBPUSH trace valid signal, the instruction address (PC value), the register number, and the register value of the DBPUSH instruction. Here, the DBPUSH trace valid signal notifies the trace unit 25 of the fact that trace information including the instruction address, the register number, and the register value of the DBPUSH instruction is valid.

As understood from the above description, in the computer according to the present embodiment, in response to decoding of one DBPUSH instruction having a field indicating a plurality of registers, the CPU 20 operates so as to supply values of the registers specified by the DBPUSH instruction to the trace unit 25. In addition, the trace unit 25 operates so as to output trace data including the values of the registers specified by the DBPUSH instruction in response to execution of the one DBPUSH instruction in the CPU 20. The DBPUSH instruction can be used in order to output, as the trace data, values of a plurality of general-purpose registers implemented in the CPU 20, and the values of the general-purpose registers are outputted as the trace data by the one DBPUSH instruction. Therefore, through the use of the computer 2 according to the present embodiment, a plurality of instructions is not required in order to output the values of the general-purpose registers as the trace data, and thus the program code size can be reduced.

(Third Embodiment)

Figure 12:
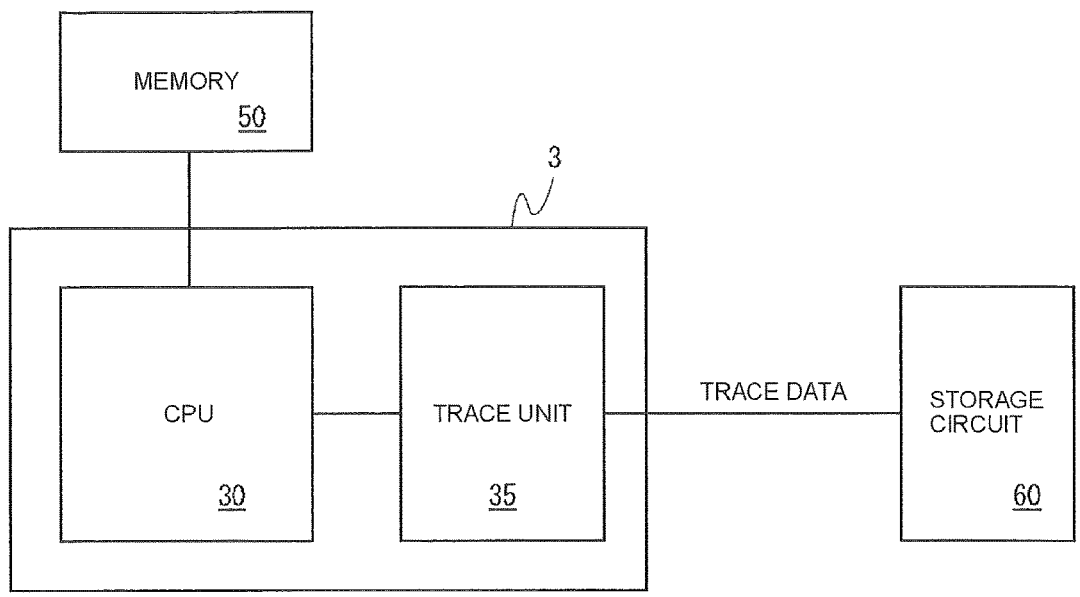
FIG. 12 is a block diagram showing a computer according to a third embodiment and peripheral devices of the computer.

In the present embodiment, a modification of the second embodiment described above will be described. FIG. 12 is a block diagram showing a computer 3 according to the present embodiment and peripheral devices of the computer 3. The computer 3 includes a CPU 30 and a trace unit 35 coupled to the CPU 30. The entire configuration of the computer 3 is the same as the configuration example of the computer 1 of the first embodiment shown in FIG. 2 or FIG. 5.

The basic operation of the computer 3 is the same as that of the computer 2 described in the second embodiment. Namely, in response to decoding of one DBPUSH instruction having a field indicating a plurality of registers, the CPU 30 operates so as to supply values of the registers specified by the DEPUSH instruction to the trace unit 35. The trace unit 35 operates so as to output trace data including the values of the registers specified by the DBPUSH instruction in response to execution of the one DBPUSH instruction in the CPU 30.

Furthermore, the computer 3 according to the present embodiment can reduce the data size of the trace data based on the DBPUSH instruction by the description and the operation as described below. That is, the CPU 30 is configured to supply a multi-cycle signal (hereinafter, referred to as a multi-cycle status signal) to the trace unit 35 in sequentially supplying the values of the registers specified by the DBPUSH instruction to the trace unit 35. The multi-cycle status signal indicates that the CPU 30 executes a multi-cycle instruction. In addition, the trace unit 35 recognizes the multi-cycle status signal and determines that a plurality of register values based on one DBPUSH instruction are sequentially outputted while the multi-cycle status signal is being issued. Then, the trace unit 35 associates the instruction address (PC value) of the one DBPUSH instruction with an output of a plurality of register numbers and the register values based on the one DBPUSH instruction in the trace data. In other words, the trace unit 35 eliminates redundancy of the instruction address (PC value) of the DBPUSH instruction included in the trace data. Thereby, the number of pieces of data indicating the address of the DBPUSH instruction included in the trace data is reduced so that the number of pieces of data is smaller than the number of registers specified by the DBPUSH instruction.

Figure 13:
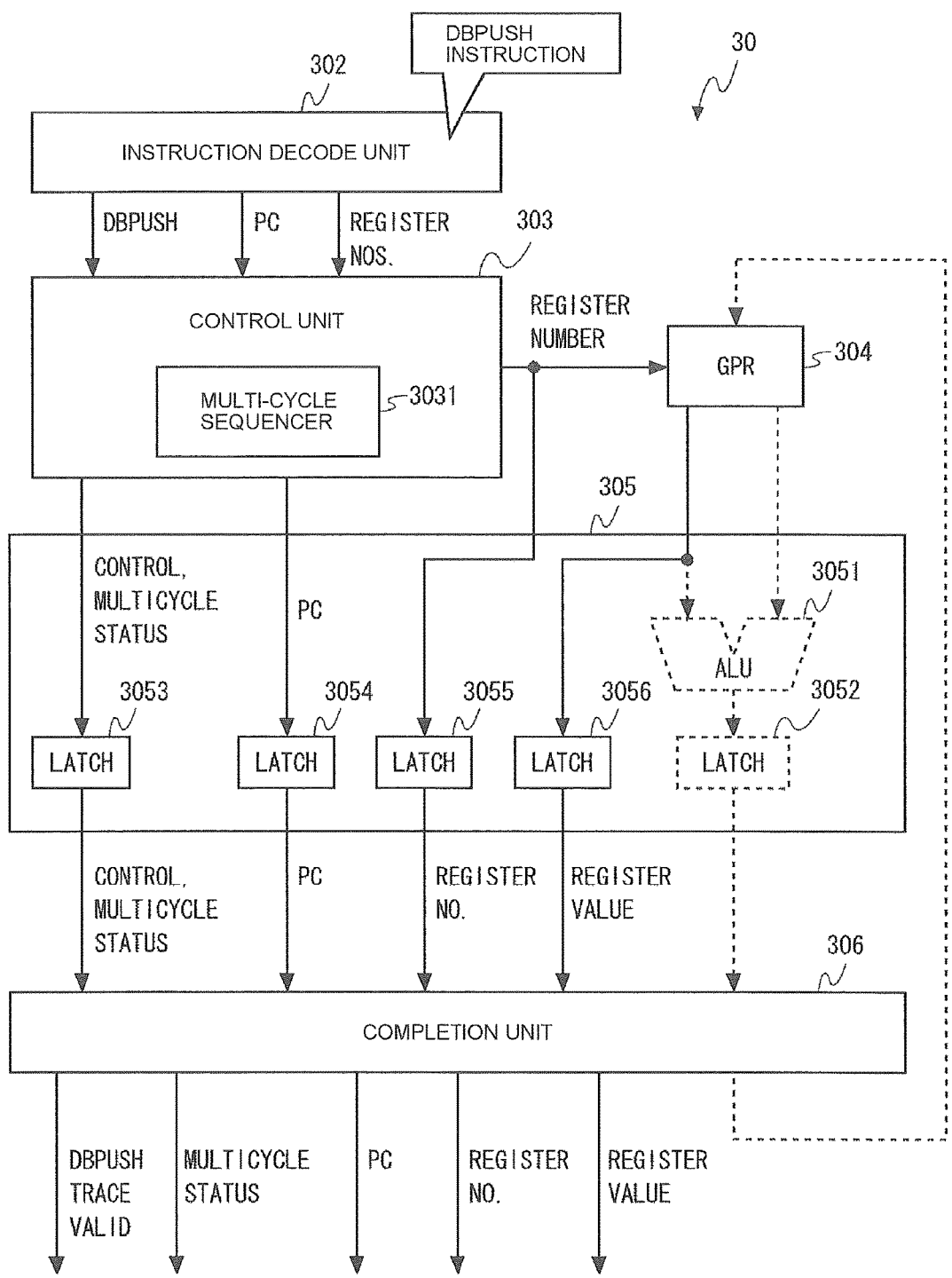
FIG. 13 is a block diagram showing an example of a configuration of the CPU according to the third embodiment.

Hereinafter, a specific example of an operation of the CPU 30 when the CPU 30 decodes the DBPUSH instruction will be described with reference to FIG. 13. The operation of the instruction decode unit 302 is the same as that of the instruction decode unit 202 in FIG. 11. The control unit 303 has the same configuration and function as those of the control unit 203 shown in FIG. 11. Furthermore, the control unit 303 operates so as to supply the multi-cycle status signal to the instruction execution unit 305 when executing the DBPUSH instruction.

The general-purpose register file 304 has the same configuration and function as those of the general-purpose register file 204 shown in FIG. 11. The instruction execution unit 305 also has the same configuration and function as those of the instruction execution unit 205 shown in FIG. 11. The ALU 3051 and the latches 3052 to 3056 correspond to the ALU 2051 and the latches 2052 to 2056 shown in FIG. 11. However, the latch 3053 latches the multi-cycle status signal in addition to the control signal indicating the DBPUSH instruction.

The completion unit 306 outputs, to the trace unit 35, the DBPUSH trace valid signal, the instruction address (PC value), the register number, and the register value of the DBPUSH instruction in the same manner as the completion unit 206 shown in FIG. 11. Furthermore, in addition to these data, the control unit 306 supplies the multi-cycle status signal to the trace unit 35.

Figure 14:
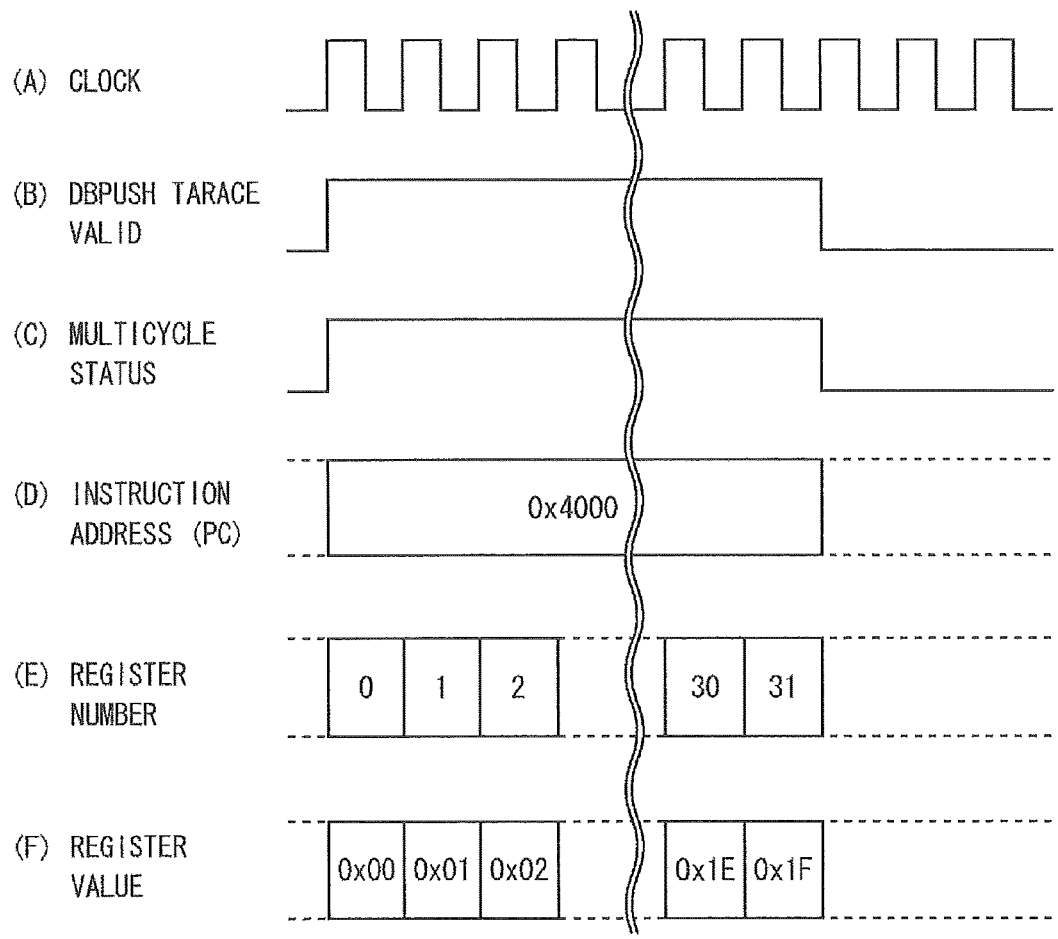
FIG. 14 is a timing chart showing trace information outputted from the CPU according to the third embodiment.

Next, the data size reduction effect of the trace data caused by the computer 3 will be described with reference to FIGS. 14 and 15. FIG. 14 is a timing chart showing trace information (trace information based on the DBPUSH instruction) supplied from the CPU 30 to the trace unit 35. FIG. 14 shows an example in which values of 32 registers R0 to R31 of register numbers 0 to 31 are outputted.

A waveform (A) in FIG. 14 shows a clock signal. A waveform (B) in FIG. 14 shows the DBPUSH trace valid signal. The high level of the DBPUSH trace valid signal means that an output of trace information from the CPU 30 is valid. A waveform (C) in FIG. 14 shows the multi-cycle status signal. The high level of the multi-cycle status signal means that the trace information is related to a multi-cycle instruction.

A waveform (D) in FIG. 14 shows an output of the instruction address (PC value). In the example of FIG. 14, the instruction address (PC value) has the same value (0x4000) indicating the DBPUSH instruction while the multi-cycle status signal (waveform (C)) is at a high level. Waveforms (E) and (F) in FIG. 14 show the register numbers and the register values, which are outputted based on the DBPUSH instruction. While the multi-cycle status signal (waveform (C)) is at a high level, the register numbers and the register values of the registers from the register R0 to the register R31 are sequentially outputted.

Figure 15:
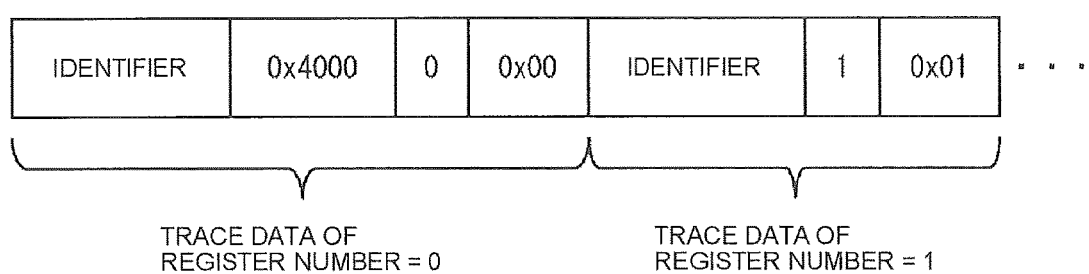
FIG. 15 is a diagram showing an example of a format of trace data generated by a trace unit according to the third embodiment.

FIG. 15 shows an example of trace data generated when the trace unit 35 receives the trace information shown in FIG. 14. In the example of FIG. 15, only the trace data of the top register R0 (the register number=0) includes the address (0x4000) of the DBPUSH instruction. However, the trace data of the register R1 (the register number=1) does not include the address (0x4000) of the DBPUSH instruction. The trace data of the registers R2 to R31 not illustrated do not include the address (0x4000) of the DBPUSH instruction in the same manner as the trace data of the register R1. Repeated inclusion of the same instruction address indicating the same DBPUSH instruction in the trace data of a plurality of registers based on one DBPUSH instruction is redundant. Therefore, in the example of FIG. 15, the address (0x4000) of the DBPUSH instruction is removed from the trace data of the registers R1 to R31.

(Fourth Embodiment)

Figure 16:
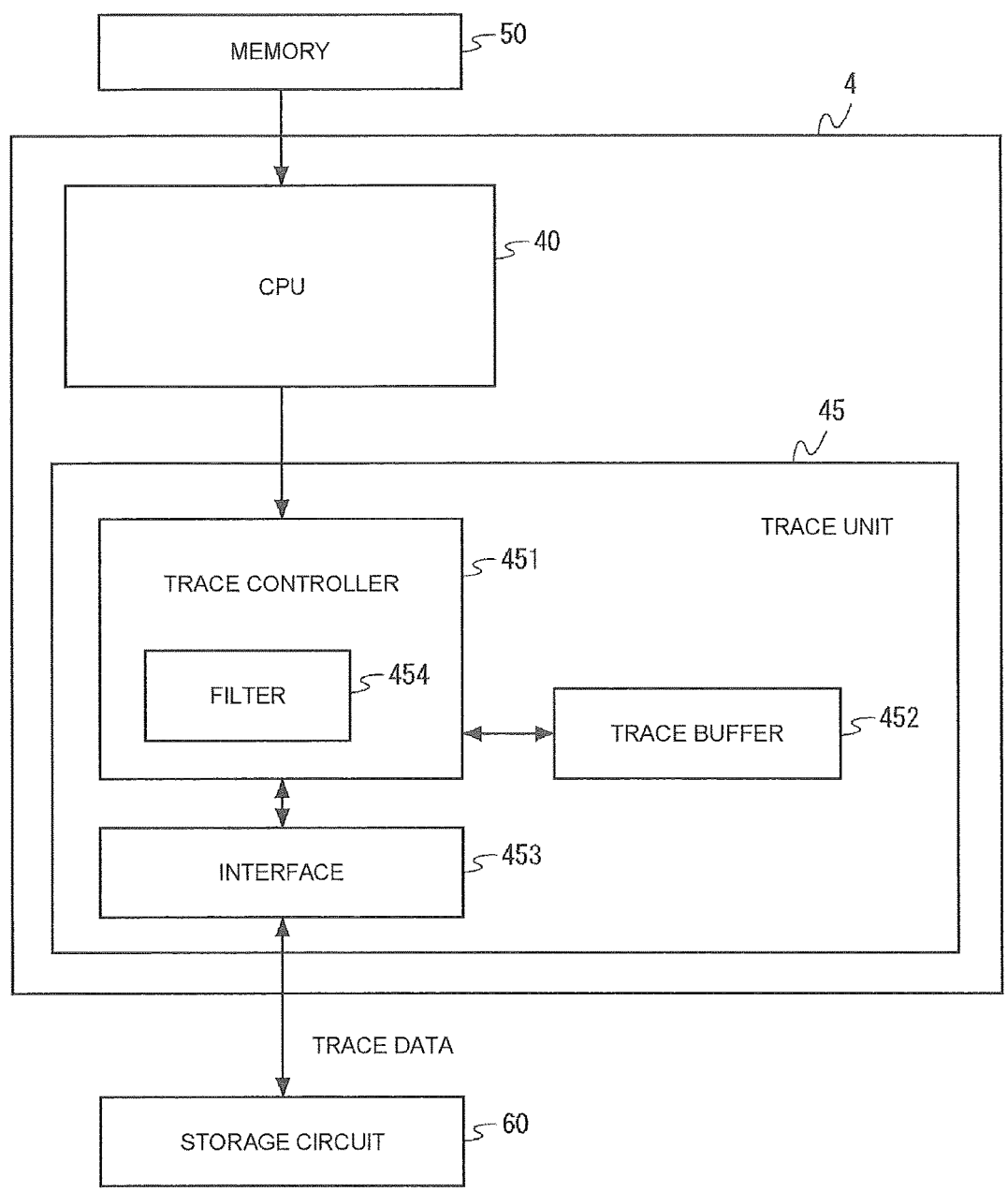
FIG. 16 is a block diagram showing a computer according to a fourth embodiment and peripheral devices of the computer.

In the present embodiment, a modification of the first to the third embodiments described above will be described. FIG. 16 shows a configuration example of a computer 4 according to the present embodiment. The computer 4 includes a CPU 40 and a trace unit 45. The CPU 40 has the same configuration and function as those of the CPUs 10, 20, or 30 described in the first to the third embodiments. The trace unit 45 has the same configuration and function as those of the trace units 15, 25, or 35 described in the first to the third embodiments. Further, the trace unit 45 has a filter 454 for selectively outputting trace data of a specific DBTAG instruction or trace data of a specific DBPUSH instruction.

The trace controller 451 filters trace information received from the CPU 40 by the filter 454, selects only trace information that coincides with a filter condition, and accumulates the trace information in a trace buffer 452. In addition, the trace controller 451 writes, to the storage device 60, the trace information which coincides with the filter condition and is accumulated in the trace buffer 452, via an interface 453.

Figure 17:
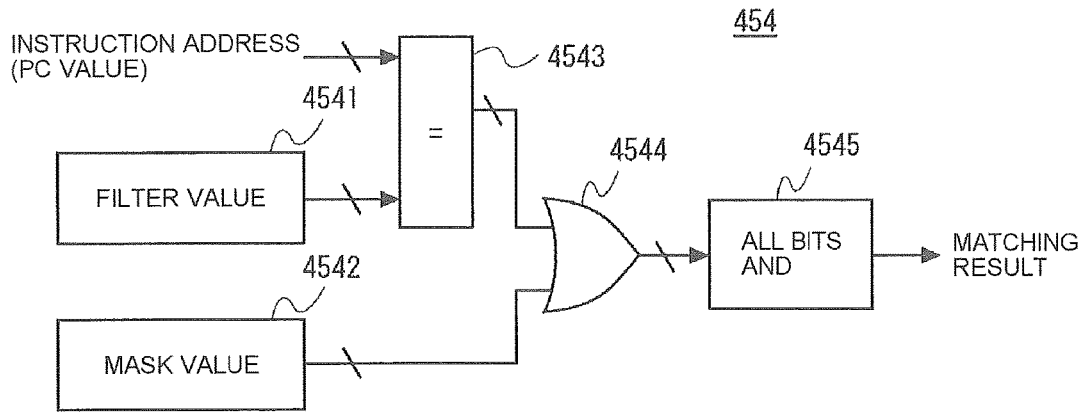
FIG. 17 is a block diagram showing a first configuration example of a filter according to the fourth embodiment.

Hereinafter, a configuration example of the filter 454 will be described with reference to FIGS. 17 to 19. The filter 454 shown in FIG. 17 performs filtering using an instruction address (PC value). A filter value register 4541 stores a value of an address to be compared with the instruction address (PC value) in the trace information. A mask value register 4542 holds a mask value for each bit of the instruction address. In the example of FIG. 17, 0 is set to values of bits to be compared and 1 is set to values of bits to be masked. The filter value register 4541 and the mask value register 4542 can be set from an external debug host via a debug communication port (for example, JTAG (Joint Test Action Group) port).

An equivalence gate 4543 is an XNOR gate. The equivalence gate 4543 compares bit by bit the instruction address (PC value) with the value of the filter value register 4541, and outputs 1 when the two input bits have the same value and outputs 0 when the two input bits have different values. An OR gate 4544 compares bit by bit output the value of the equivalence gate 4543 with the value of the mask value register 4542 and calculates logical OR for each bit. An AND circuit 4545 calculates logical AND of all bits of the output value from the OR gate 4544. An output from the AND circuit 4545 indicates a matching result, and an output value of 1 indicates matching and an output value of 0 indicates mismatching.

Figure 18:
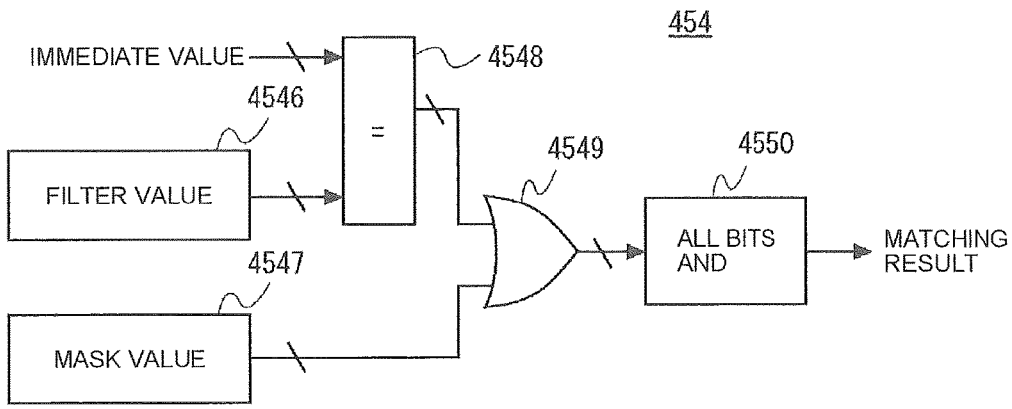
FIG. 18 is a block diagram showing a second configuration example of the filter according to the fourth embodiment.

In FIG. 18, a filtering using the immediate value included in the trace information of the DETAG instruction described in the first embodiment is performed. A filter value register 4546 stores a value to be compared with the immediate value in the trace information. A mask value register 4547 holds a mask value for each bit of the immediate value. In the example of FIG. 18, 0 is set to values of bits to be compared and 1 is set to values of bits to be masked. The filter value register 4546 and the mask value register 4547 can be set from an external debug host via a debug communication port (for example, JTAG (Joint Test Action Group) port).

The configuration example of FIG. 18 is the same as that of FIG. 17. Namely, the equivalence gate 4548 compares bit by bit the immediate value in the trace information with the value of the filter value register 4546, and outputs 1 when the two input bits have the same value and outputs 0 when the two input bits have different values. An OR gate 4549 compares bit by bit the output value of the equivalence gate 4548 with the value of the mask value register 4547 and calculates logical OR for each bit. An AND circuit 4550 calculates logical AND of all bits of output values from the OR gate 4549. An output from the AND circuit 4550 indicates a matching result. An output value of 1 indicates matching and an output value of 0 indicates mismatching.

Figure 19:
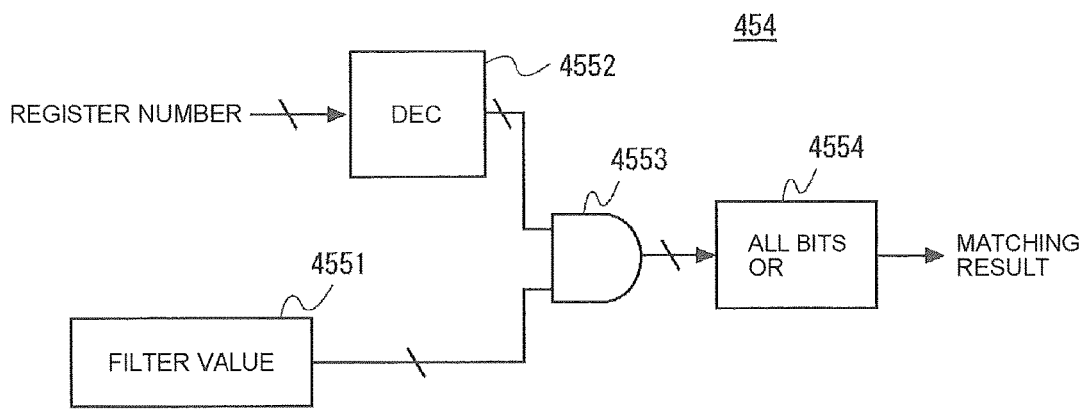
FIG. 19 is a block diagram showing a third configuration example of the filter according to the fourth embodiment.

A filter 454 shown in FIG. 19 performs filtering using the register number included in the trace information of the DBPUSH instruction described in the second and the third embodiments. A filter value register 4551 stores a value to be compared with the register number in the trace information. Each bit of the filter value register 4551 is associated with any of register numbers. For example, when the filter value register 4551 is a 32-bit register, the 32 bits are sequentially associated with 32 registers R0 to R31 from the least significant bit of the register.

A bit conversion circuit 4552 receives the register number in binary notation in the trace information and generates output data in which 1 is set to bits corresponding to the register number in decimal notation and 0 is set to the other bits. For example, a case is considered in which there are 32 general-purpose registers and the register numbers indicated by the trace information is 0 to 31. When the register number is 0, the bit conversion circuit 4552 outputs 32-bit data in which all bits are set to 0. When the register number is 1, the bit conversion circuit 4552 outputs 32-bit data in which the least significant bit is set to 1 and all the other 31 bits are set to 0. When the register number is 31, the bit conversion circuit 4552 outputs 32-bit data in which the most significant bit is set to 1 and all the other 31 bits are set to 0.

An AND gate 4553 compares bit by bit the output values of the bit conversion circuit 4552 with the values of the filter value register 4551 and calculates logical AND for each bit. An OR circuit 4554 calculates logical OR of all bits of output values from the AND gate 4553. An output from the OR circuit 4554 indicates a matching result. An output value of 1 indicates matching and an output value of 0 indicates mismatching.

The present embodiment can select and output only specific trace data. For example, the present embodiment can select and output only trace data in which the instruction address (PC value) coincides with a specific value or a specific range. Further, the present embodiment can select and output only trace data in which the immediate value of the DBTAG instruction coincides with a specific value or a specific range. Furthermore, the present embodiment can select and output only trace data in which a register number among a plurality of register values outputted based on the DBPUSH instruction coincides with a specific value or a specific range.

(Fifth Embodiment)

Figure 20:
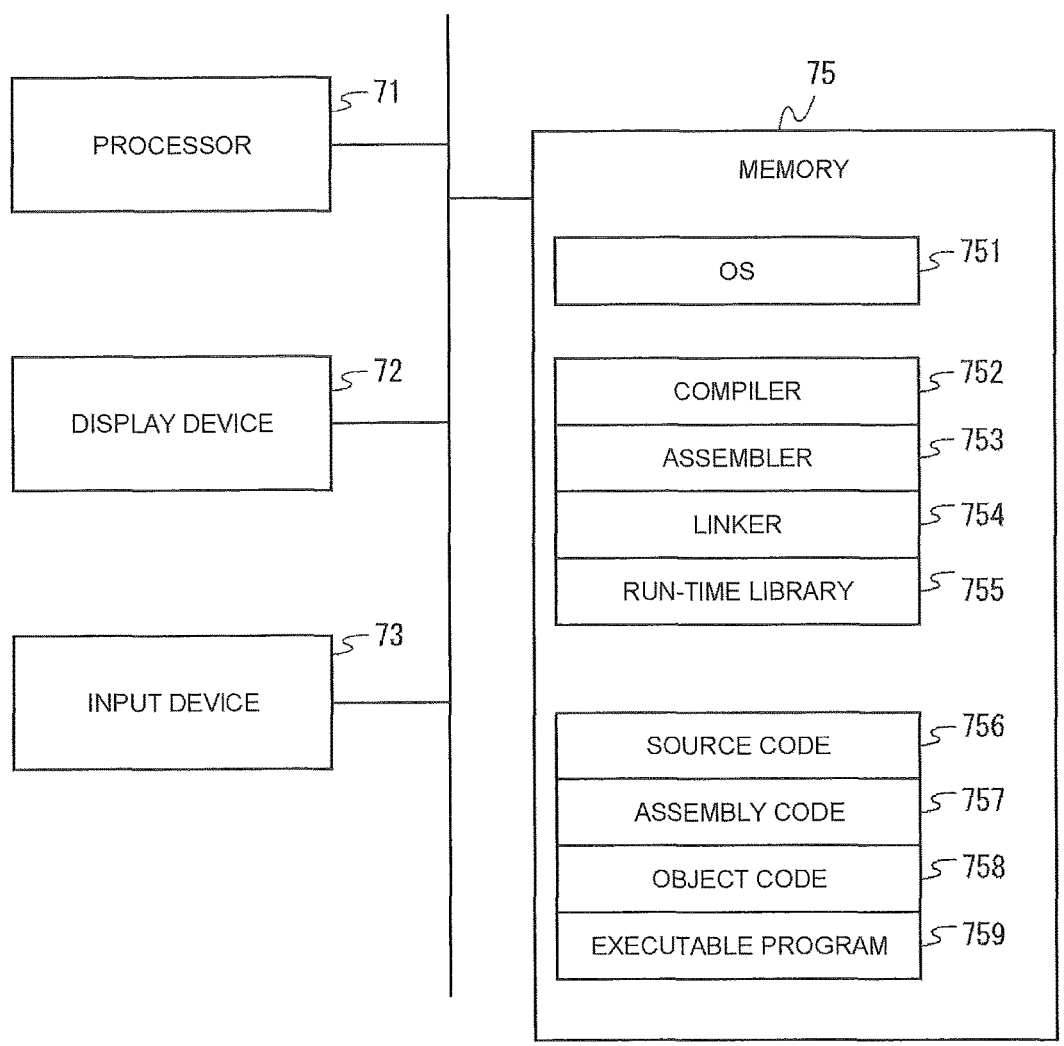
FIG. 20 is a block diagram showing a configuration example of a computer system according to a fifth embodiment.

In the present embodiment, a device to generate an executable program executed by the computers according to the first to the fourth embodiments described above will be described. FIG. 20 is a block diagram showing a configuration example of a computer system 70 according to the present embodiment. The computer system 70 includes a processor 71, a display device 72, an input device 73, and a memory 75. The processor 71 performs processing for generating an executable program 759 from a source code 756 by reading and executing computer programs such as an operating system 751, a compiler 752, an assembler 753, and a linker 754, which are stored in the memory 75. The processor 71 includes, for example, one or a plurality of CPUs.

The display device 72 is a device that provides visual information to a user. The display device 72 is, for example, a liquid crystal display, an organic EL (electroluminescence) display, or a CRT (Cathode Ray Tube) display. The input device 73 is a device that receives operation information of the user. For example, the input device 73 is a keyboard, a pointing device (mouse, trackball, touch pad, and the like), a touch panel, or a combination of these devices.

The memory 75 may be configured by a volatile memory, a non-volatile memory, or a combination of these. The volatile memory is, for example, an SRAM, a DRAM (Dynamic Random Access Memory), or a combination of these. The non-volatile memory is, for example, a mask ROM, a programmable ROM, a flash memory, a hard disk drive, or a combination of these. In addition, the memory 75 may include a storage arranged away from the processor 71. In this case, the processor 71 may access the memory 75 via a communication interface not illustrated.

Figure 21:
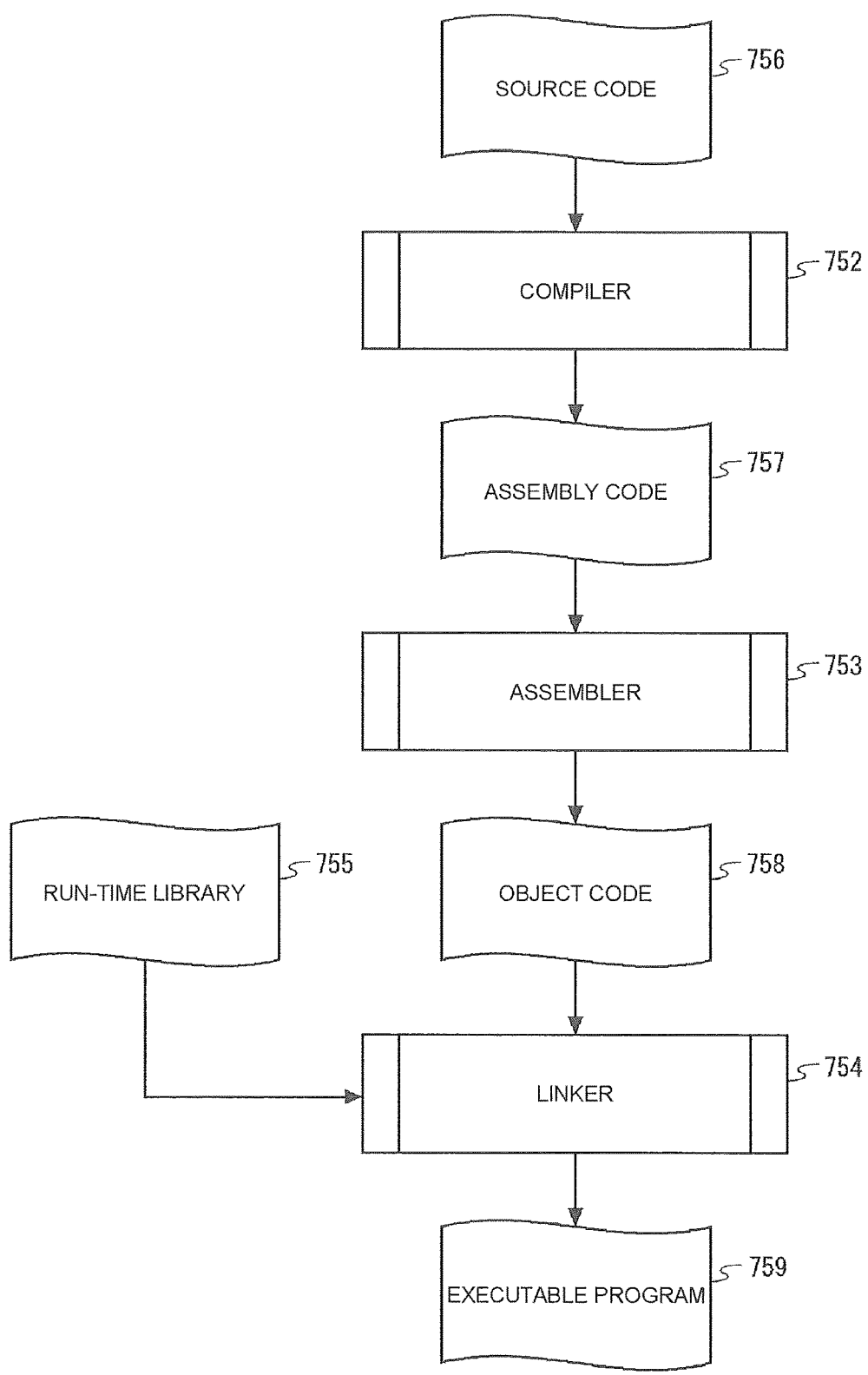
FIG. 21 is a diagram showing a process of converting source code into an executable program.

FIG. 21 is a conceptual diagram showing a process of converting source code into an executable program. The compiler 752 converts the source code 756 into assembly code 757. The source code 756 includes one or a plurality of source code files. The assembly code 757 includes one or a plurality of assembly code files. The assembler 753 converts the assembly code 757 into object code 758. The object code 758 includes one or a plurality of object code files. Meanwhile, the functions of the compiler 752 and the assembler 753 in FIG. 21 may be collectively referred to as a compiler. In other words, the processing of converting the source code 756 into the object code 758 may be referred to as compiling.

The linker 754 generates one executable program 759 by linking the object code 758 with a run-time library 755.

Subsequently, hereinafter, compiling processing of the compiler 752 will be described in further detail. The compiler 752 operates so as to insert, into the assembly code 757, the DBTAG instruction having the immediate field indicating an identifier of a function, a thread, a process, or a task, included in the source code 756. Therefore, the assembly code 757 includes (a) an assembly code section for performing processing of the function, the thread, the process, or the task included in the source code 756 and (b) the DBTAG instruction associated with the function, the thread, the process, or the task. The DBTAG instruction may be arranged immediately before, immediately after, or in the assembly code section corresponding to the function, the thread, the process, or the task. The detail of the DBTAG instruction has already been described in the first embodiment, and thus the redundant description is omitted.

The compiler 752 may further insert the DHPUSH instruction described in the second and the third embodiments into the assembly code 757, in order to trace values of a plurality of registers that stores a plurality of arguments or a plurality of return values of the function, the thread, the process, or the task, included in the source code 756.

Figure 22:
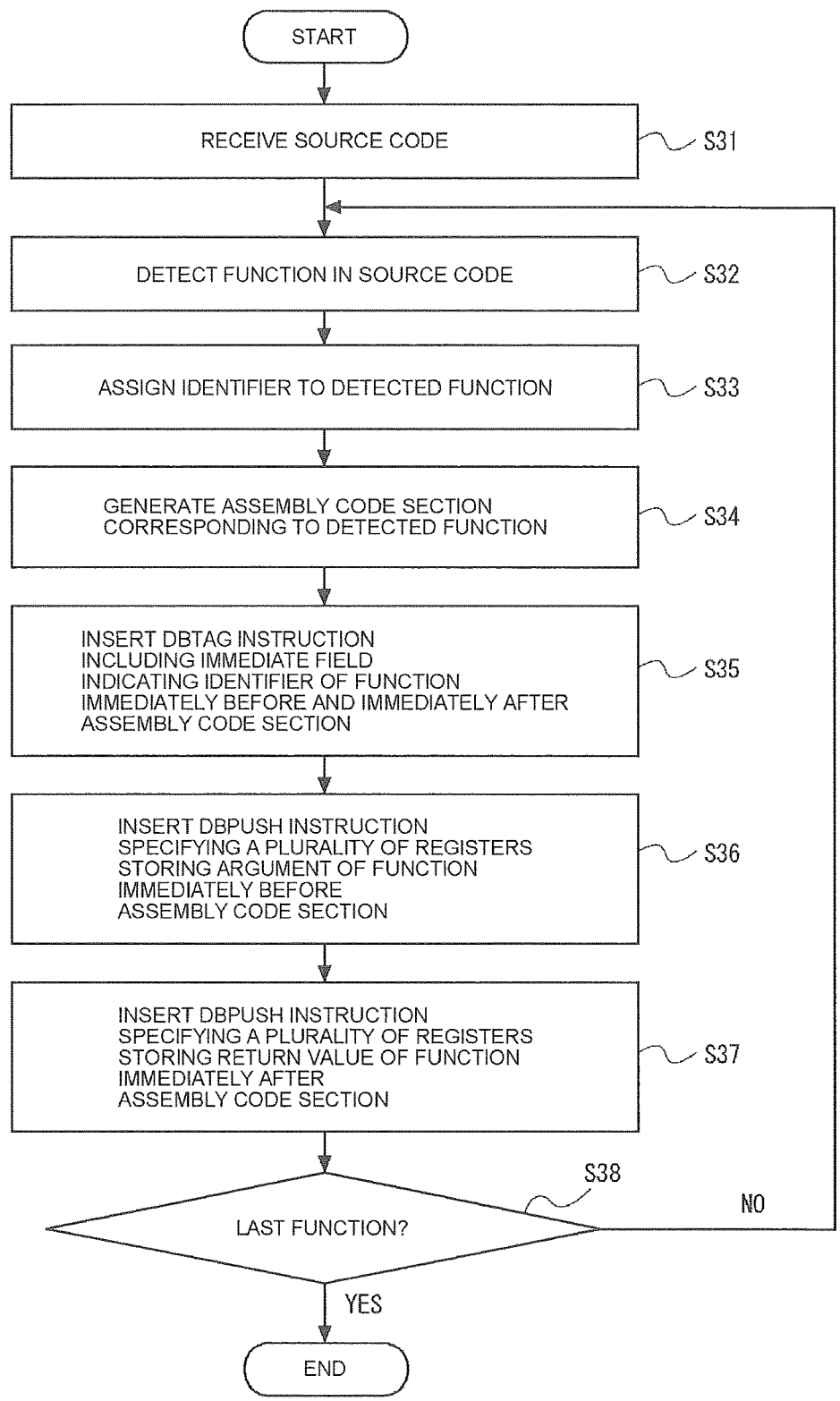
FIG. 22 is a flowchart showing an example of compiling processing according to the fifth embodiment.

FIG. 22 is a flowchart showing an example of compiling processing according to the present embodiment. In step S31, the compiler 752 receives the source code 756. In step S32, the compiler 752 detects the function in the source code 756. In step S33, the compiler 752 assigns an identifier to the detected function. In step S34, the compiler generates an assembly code section corresponding to the detected function.

In step S35, the compiler 752 inserts the DBTAG instruction having the immediate field indicating an identifier of the function immediately before and immediately after the assembly code section generated in step S34. Meanwhile, in step S35, the DBTAG instruction may be inserted either immediately before or immediately after the assembly code section. In addition, the DBTAG instruction may be arranged in the assembly code section, for example, at the top position or the tail position of the assembly code section.

In step S36, the compiler 752 inserts the DBPUSH instruction including a field that specifies a plurality of general-purpose registers storing an argument of the detected function, immediately before the assembly code section generated in step S34. The DBPUSH instruction may be arranged at the top position of the assembly code section.

In step S37, the compiler 752 inserts the DBPUSH instruction including a field that specifies a plurality of general-purpose registers storing a return value of the detected function, immediately after the assembly code section generated in step S34. The DBPUSH instruction may be arranged at the tail position of the assembly code section.

The compiler 752 repeatedly performs processing of steps S32 to S37 until the last function in the source code 756 is processed (step S38).

Meanwhile, the flowchart in FIG. 22 shows an example of the compiling processing that generates both the DBTAG instruction for tracing an identifier of a function and the DBPUSH instruction for tracing an argument and a return value of a function. As shown in FIG. 22, it is possible to trace execution of functions in the computer 1 in detail by using a combination of the DBTAG instruction and the DBPUSH instruction. However, the generation of the DBTAG instruction and the generation of the DBPUSH instruction may be performed independently from each other and the DBTAG instruction and the DBPUSH instruction may be used independently from each other. For example, the compiling processing according to the present embodiment may generate the DBTAG instruction for tracing an identifier of a function, a thread, or the like, and need not generate the DBPUSH instruction for tracing an argument and a return value of a function, a thread, or the like. On the contrary, the compiling processing according to the present embodiment may generate the DBPUSH instruction for tracing an argument and a return value of a function, a thread, or the like, and need not generate the DBTAG instruction for tracing an identifier of a function, a thread, or the like. The compiling processing according to the present embodiment may generate the DBTAG instruction for tracing an identifier of a function for specific functions and generate the DBPUSH instruction for tracing an argument and a return value of a function for other specific functions.

According to the computer system 70 or the compiler 752 according to the present embodiment, it is possible to use the DBTAG instruction described in the first embodiment for applications outputting, as trace data, an identifier of a function, a thread, a process, or a task. Furthermore, according to the computer system 70 or the compiler 752, it is possible to use the DBPUSH instruction described in the second and the third embodiments for applications outputting, as trace data, a plurality of arguments or a plurality of return values of a function, a thread, a process, or a task.

(Other Embodiments)

The plural embodiments described above may be properly combined and carried out.

The computers 1 to 4 described in the first to the fourth embodiments may have a multi-core configuration having a plurality of CPUs (CPU cores, MPU cores, or processor cores). In a computer of the multi-core configuration, the transition of function, thread, process, or task is further complicated and thus the use of the DBTAG instruction and the DBPUSH instruction described in the first to the fourth embodiments may be further more effective than in a single-core configuration.

Moreover, the embodiments described above are only examples of applications of technical ideas obtained by the inventors of the present invention. Namely, the technical ideas are not limited to the embodiments described above, and it is needless to say that various modifications are possible.

For example, the technical ideas obtained by the present inventors include the embodiments A1 to A19 described below.

(Embodiment A1)

A compiling method including reading source code from a memory, and analyzing the source code and converting the source code into assembly code, in which the converting includes inserting, into the assembly code, (a) an assembly code section for executing processing of a function, a thread, a process, or a task, included in the source code and (b) a first assembly instruction having an immediate field indicating an identifier of the function, the thread, the process, or the task into the assembly code.

(Embodiment A2)

The compiling method described in the embodiment A1, in which when executable program code based on the assembly code is executed by a CPU (Central Processing Unit), the first assembly instruction causes the CPU to operate so as to supply the identifier indicated in the immediate field to a trace unit coupled to the CPU.

(Embodiment A3)

The compiling method described in the embodiment A1 or A2, in which the source code does not include an explicit instruction corresponding to the first assembly instruction.

(Embodiment A4)

The compiling method described in any one of the embodiments A1 to A3, in which the converting further includes generating the first assembly instruction from the source code that does not include an explicit instruction corresponding to the first assembly instruction in response to detection of the function, the thread, the process, or the task.

(Embodiment A5)

The compiling method described in any one of the embodiments A1 to A4, in which the inserting includes arranging the first assembly instruction immediately before the assembly code section, in the assembly code section, or immediately after the assembly code section.

(Embodiment A6)

The compiling method described in any one of the embodiments A1 to A5, in which the first assembly instruction does not include a register field for specifying a register operand.

(Embodiment A7)

The compiling method described in any one of the embodiments A1 to A6, in which the first assembly instruction includes only one instruction.

(Embodiment A8)

The compiling method described in any one of the embodiments A1 to A7, in which the converting further includes inserting a second assembly instruction into the assembly code, and the second assembly instruction has a field indicating a plurality of registers that store an argument or a return value of the function, the thread, the process, or the task.

(Embodiment A9)

The compiling method described in the embodiment A8, in which when executable program code based on the assembly code is executed by a CPU (Central Processing Unit), the second assembly instruction causes the CPU to operate so as to supply values of the registers to a trace unit coupled to the CPU.

(Embodiment A10)

A program for causing a computer to perform the compiling method described in any one of the embodiments A1 to A9.

(Embodiment A11)

A compiling device including a processor configured so as to execute a compiling procedure, in which the compiling procedure includes reading source code from a memory, and analyzing the source code and converting the source code into assembly code, and the converting includes inserting, into the assembly code, (a) an assembly code section for executing processing of a function, a thread, a process, or a task, included in the source code and (b) a first assembly instruction having an immediate field indicating an identifier of the function, the thread, the process, or the task.

(Embodiment A12)

The compiling device described in the embodiment A11, in which when executable program code based on the assembly code is executed by a CPU (Central Processing Unit), the first assembly instruction causes the CPU to operate so as to supply the identifier indicated in the immediate field to a trace unit coupled to the CPU.

(Embodiment A13)

The compiling device described in the embodiment A11 or A12, in which the source code does not include an explicit instruction corresponding to the first assembly instruction.

(Embodiment A14)

The compiling device described in any one of the embodiments A11 to A13, in which the converting further includes generating the first assembly instruction from the source code that does not include an explicit instruction corresponding to the first assembly instruction in response to detection of the function, the thread, the process, or the task.

(Embodiment A15)

The compiling device described in any one of the embodiments A11 to A14, in which the inserting includes arranging the first assembly instruction immediately before the assembly code section, in the assembly code section, or immediately after the assembly code section.

(Embodiment A16)

The compiling device described in any one of the embodiments A11 to A15, in which the first assembly instruction does not include a register field for specifying a register operand.

(Embodiment A17)

The compiling device described in any one of the embodiments A11 to A16, in which the first assembly instruction includes only one instruction.

(Embodiment A18)

The compiling device described in any one of the embodiments A11 to A17, in which the converting further includes inserting a second assembly instruction into the assembly code, and the second assembly instruction has a field indicating a plurality of registers that store an argument or a return value of the function, the thread, the process, or the task.

(Embodiment A19)

The compiling device described in the embodiment A18, in which when executable program code based on the assembly code is executed by a CPU (Central Processing Unit), the second assembly instruction causes the CPU to operate so as to supply values of the registers to a trace unit coupled to the CPU.

What is claimed is:

1. A computer system, comprising:
a CPU (Central Processing Unit); and
a trace unit coupled to the CPU,
wherein the CPU is configured so as to:
sequentially retrieve and decode instructions of a sequence of instructions comprising a computer program being executed by the CPU from a memory accessible by the CPU; and
for each retrieved and decoded instruction, analyze an operation code of the retrieved and decoded instruction to determine whether the instruction comprises a tracing operation instruction as a high-level computer language instruction that can be selectively and arbitrarily embedded as a high-level computer language instruction into the computer program stored in the memory as a high-level computer program to be retrieved, decoded, compiled, and executed by the CPU, the tracing operation instruction comprising a first field and a second field, the first field comprising a tracing operation instruction code and the second field comprising an immediate field for indicating a value of a constant that provides an identifier unique to each of an execution instance of the tracing operation instruction,
wherein:
if the retrieved and decoded instruction is determined not to be the tracing operation instruction, then the CPU executes an operation other than tracing, as indicated by whatever operation code other than tracing is included in the retrieved, decoded, and compiled instruction, and
if the retrieved and decoded instruction is determined to be the tracing operation instruction, then the CPU supplies the constant in the immediate field to the trace unit as the identifier for instructions to be traced as a result of the tracing operation instruction being embedded in the computer program, based on information in the immediate field,
wherein the trace unit is configured so as to output trace data, including the constant, in response to execution of the tracing operation instruction in the CPU, as a tracing operation within the computer program being executed by the CPU, the constant from the immediate field of the tracing operation instruction thereby providing an identifier unique to the tracing operation initiated by the tracing operation instruction, and
wherein the CPU further supplies a value of a program counter (PC) to the trace unit as a result of compiling the tracing operation instruction.

2. The computer system according to claim 1, wherein the constant indicates an identifier of a function, a thread, a process, or a task, included in the computer program being executed by the CPU.

3. The computer system according to claim 2, wherein the tracing operation instruction is arranged by a compiler in any of immediately before an instruction group of the function, the thread, the process, or the task, in the instruction group, or immediately after the instruction group, in the program.

4. The computer system according to claim 1, wherein the tracing operation instruction does not include a register field for specifying a register operand.

5. The computer system according to claim 1, wherein the tracing operation instruction includes only one instruction when compiled as an instruction.

6. The computer system according to claim 1, wherein the CPU includes a plurality of general-purpose registers specified as a register operand in an instruction executed by the CPU, and
the CPU supplies the constant to the trace unit without storing the constant in the general-purpose registers in an execution of the tracing operation instruction.

7. The computer system according to claim 1, wherein the CPU includes:
an instruction decode and dispatch unit;
an execution unit;
a plurality of general-purpose registers versatilely used in order to temporarily store data inputted into the execution unit and data outputted from the execution unit; and
a completion unit,
wherein the instruction decode and dispatch unit are configured so as to supply the constant indicated in the immediate field to the execution unit in response to decoding and compiling of the tracing operation instruction,
wherein the execution unit is configured so as to supply the constant to the completion unit without storing the constant in the general-purpose registers in an execution of the tracing operation instruction, and
wherein the completion unit is configured so as to supply an execution result of the tracing operation instruction including the constant to the trace unit.

8. The computer system according to claim 1, wherein the trace data further includes an address of the tracing operation instruction.

9. The computer system according to claim 1, wherein the trace unit includes a filter circuit that filters the constant on the basis of a first condition and that selectively outputs the constant as the trace data on a condition that the constant coincides with the first condition.

10. The computer system according to claim 1, wherein information can be selectively inserted into the second field of the tracing operation instruction as a part of embedding the tracing operation instruction into the high-level computer program.

* * * * *